United States Patent [19]

Nishihara et al.

[11] Patent Number: 5,604,048
[45] Date of Patent: Feb. 18, 1997

[54] ELECTRICALLY CONDUCTING CERAMIC AND FUEL CELL USING THE SAME

[75] Inventors: Masato Nishihara; Masahide Akiyama; Shoji Yamashita, all of Kokubu, Japan

[73] Assignee: Kyocera Corporation, Kyoto, Japan

[21] Appl. No.: 484,763

[22] Filed: Jun. 7, 1995

Related U.S. Application Data

[63] Continuation-in-part of Ser. No. 201,568, Feb. 25, 1994, abandoned.

[30] Foreign Application Priority Data

| Feb. 26, 1993 | [JP] | Japan | 5-38690 |
| Mar. 23, 1993 | [JP] | Japan | 5-63722 |
| Mar. 29, 1993 | [JP] | Japan | 5-70248 |
| Apr. 9, 1993 | [JP] | Japan | 5-83370 |
| Apr. 9, 1993 | [JP] | Japan | 5-83371 |
| Apr. 14, 1993 | [JP] | Japan | 5-87406 |

[51] Int. Cl.$^6$ ........................... H01M 4/86
[52] U.S. Cl. .......................... 429/44; 429/30; 429/31; 429/33; 429/40; 429/193; 429/218; 252/521; 501/152
[58] Field of Search ............... 252/521; 501/152; 429/30, 31, 33, 40, 193, 218, 44

[56] References Cited

U.S. PATENT DOCUMENTS

| 4,562,124 | 12/1985 | Ruka | 429/31 |
| 5,134,042 | 7/1992 | Madon et al. | 429/33 |
| 5,266,419 | 11/1993 | Yamada | 429/30 |
| 5,453,330 | 9/1995 | Kawasaki et al. | 429/30 |

*Primary Examiner*—Bruce F. Bell
*Attorney, Agent, or Firm*—Loeb & Loeb LLP

[57] ABSTRACT

The present invention is an electrically conducting ceramic having improved electrical conductivity which comprises a perovskite-type composite oxide of a composition represented by the following formula $$(La_{1-x-y}A_xB_y)_z(Mn_{1-u}C_u)_vO_\delta$$

wherein A represents at least one type of atom selected from the group consisting of Sc, Y, Nd, Yb, Er, Gd, Sm and Dy, B represents at least one type of atom selected from the group consisting of Ba, Sr and Ca, and C represents at least one type of atom selected from the group consisting of Co, Fe, Ni, Ce, Zr, Mg, Al, Sb and Cr, and x, y, z, u, v and δ are the numbers that satisfy the following formulas:

$0.02 \leq x \leq 0.5$, $0.1 \leq y \leq 0.6$, $0.90 \leq z \leq 1.05$, $0 \leq u \leq 0.5$, $v = 1.0$, and at a temperature of 1000° C. in the open air, $2.97 \leq \delta \leq 3.04$.

A tubular-type fuel cell containing an electroconductive ceramic in accordance with this invention as an air electrode does not deform during operation for long period of time and yields a stabilized output and a planar type fuel cell which is free from peeling of air electrodes or does not decrease its output by the deformation of the cell.

12 Claims, 4 Drawing Sheets

5,604,048

ELECTRICALLY CONDUCTING CERAMIC AND FUEL CELL USING THE SAME

This application is a continuation in part of 08/201,568 filed on Feb. 25, 1994, now abandoned.

BACKGROUND OF THE INVENTION

1. Field of the Invention

The present invention relates to a novel electrically conducting ceramic that can be desirably used as an electrode material in an electrochemical apparatus operated at high-temperature conditions in addition to being used for the isolation of gases and electrolysis in a vapor phase.

The invention further relates to a solid oxide fuel cell and, particularly, to an improvement of an air electrode formed on one surface of a solid electrolyte.

2. Description of the Prior Art

Ceramic materials have heretofore been used in a variety of applications owing to their multiple functions. Among them, a ceramic having electrically conducting property is finding applications in various fields where it is not allowed to used metals to substitute for the metals that are good electrically conducting materials.

In a solid oxide fuel cell, for instance, electrodes are deposited on both sides of the electrolyte. Such a fuel cell makes use of an electrically conducting ceramic of the type of oxide as a cathode electrode since the environment in which it is used is as severe as 800° C. or higher.

The solid oxide fuel cells that are known so far can be divided into two types, i.e., those of the tubular type and those of the planar type. The fuel cell of the planar type has an advantage of power generation of a high power density per a unit volume but involves problems in regard to incomplete gas sealing and non-uniform temperature distribution in the cell when it is to be put into practical use. On the other hand, the fuel cell of the tubular type has a low power density but presents such features that the cell has a large mechanical strength and the temperature is maintained uniform in the cell. Study has been positively forwarded concerning the solid oxide fuel cells of these two types in order to utilize their respective features.

In the fuel cell of the tubular type, a unit cell is obtained as shown in FIG. 3 by forming a porous air electrode 2 composed of an $LaMnO_3$-type material by the slurry-dip method on the surface of a support tube 1 composed of a CaO-stabilized $ZrO_2$ having an open porosity of about 40%, forming on the surface thereof a $Y_2O_3$ stabilized $ZrO_2$ electrolyte 3 by the vapor-phase synthesizing method (EVD) or the spraying method, and forming a fuel electrode 4 composed of porous Ni-zirconia cermet surface of the solid electrolyte. In a module of fuel cell, a plurality of the thus constituted single cells are connected together via an interconnector 5 composed of an $LaCrO_3$-type material or the like material. The electric power is generated by flowing the air (oxygen) into the support tube 1 and flowing the fuel (hydrogen) into the outer portion at a temperature of 1000° to 1050° C.

In order to fabricate the fuel cell through a simplified process in recent years, it has been attempted to use the $LaMnO_3$-type material which is the air electrode directly as a porous support tube. As the support tube material which also functions as the air electrode, use is made of the $LaMnO_3$ solid solution in which La is substituted by 10–20 atomic % of Ca or 10–15 atomic% of Sr.

In a single cell of the fuel cell of the planar type which uses the same materials as those of the tubular type fuel cell as shown in FIG. 4, on the other hand, a porous air electrode 9 is provided on one side of a solid electrolyte 8 and a porous fuel electrode 10 is provided on the other side thereof. The single cells are connected together by a separator 11 composed of the $LaCrO_3$-type material in which is solid-dissolved MgO or CaO which is a dense material. The electric power is generated by feeding the air (oxygen) toward the side of the air electrode and feeding the fuel (hydrogen) toward the side of the fuel electrode at a temperature of 1000° to 1050° C.

In the above-mentioned $LaMnO_3$ perovskite-type composite oxide, however, the electrical conductivity is about 150 to $200\Omega^{-1} \cdot cm^{-1}$ in the open air at 1000° C. In can be expected to increase the formation of holes by substituting La in an increased amount with a divalent metal element. When La is substituted by more than about 30%, however, there is formed a crystal phase which is different from the perovskite type, and the electrical conductivity is not improved.

Furthermore, according to the report of Mori et al. in Electrical Central Laboratory Report (W90002) dated Feb. 7, 1990, $LaMnO_3$-type perovskite compounds have three type crystalline structures according to temperatures, and have a problem of lacking stability at high temperatures because the thermal expansion behaviors of these crystalline phases are different. The report tells that stability at high temperatures is improved by substituting a part of La with a moderate amount of Sr or Ca. But in a system wherein a part of La is substituted with Sr or Ca, the crystalline structure changes. Thus, a substantial improvement is not attained. On the other hand, Japanese Laid-Open Patent Publication No. 303565/1992 proposes that annealing treatment is carried out at a temperature of 800 to 1400° C. in order to solve a problem that La (Sr, Ca) $MnO_3$ is unstable at high temperatures. Its effect is not sufficient.

Moreover, in a cell of the structure in which the CaO-stabilized $ZrO_2$ is used as the support tube and is equipped with the $LaMnO_3$ material as the air electrode in which is solid-dissolved SrO, and in a tubular fuel cell of the structure which uses the air electrode directly as the support tube, when a power generating system using this material is operated for a long period of time, the cell is deformed or the output decreases.

SUMMARY OF THE INVENTION

The present inventors have forwarded the study in an effort to solve the above-mentioned problems, and have discovered that upper limit of the amount of substituting a divalent metal can be pulled up without forming a different phase if part of La in the lanthanum manganite ($LaMnO_3$) is substituted by a divalent metal element and a trivalent metal element of the Group IIIa of periodic table simultaneously, that the electrical conductivity can be further increased compared to that of prior art, and that this composite oxide exhibits excellent stability, and have thus arrived at the present invention.

That is, the object of the present invention is to provide a novel electrically conducting ceramic having improved electrical conductivity.

Another object of this invention is to provide a tubular type fuel cell which does not deform during operation for a long period of time and yields a stabilized output and a planar type fuel cell which is free from peeling of air electrodes or does not decrease its output by the deformation of the cell.

According to the present invention, there is provided an electrically conducting ceramic comprising a perovskite-type composite oxide of a composition represented by the following formula $$(La_{1-x-y}A_xB_y)_z(Mn_{1-u}C_u)_vO_\delta \quad (I)$$

wherein A represents at least one type of atom selected from the group consisting of Sc, Y, Nd, Yb, Er, Gd, Sm and Dy, B represents at least one type of atom selected from the group consisting of Ba, Sr and Ca, and C represents at least one type of atom selected from the group consisting of Co, Fe, Ni, Ce, Zr, Mg, Al, Sb and Cr, and x, y, z, u, v and δ are the numbers that satisfy the following formulae:

$$0.02 \leq x \leq 0.5 \quad (i)$$

$$0.1 \leq y \leq 0.6 \quad (ii)$$

$$0.90 \leq z \leq 1.05 \quad (iii)$$

$$0 \leq u \leq 0.5 \quad (iv)$$

and $$v = 1.0,$$

and at a temperature of 1000° C. in the open air, $$2.97 \leq \delta \leq 3.04.$$

According to the present invention, furthermore, there is provided a solid oxide fuel cell in which an air electrode is provided on one surface of a solid electrolyte and a fuel electrode is provided on the other surface thereof, wherein said air electrode comprises a perovskite-type composite oxide represented by the following formula $$(La_{1-x-y}A_xB_y)_z(Mn_{1-u}C_u)_vO_\delta \quad (Ib)$$

wherein A represents at least one type of atom selected from the group consisting of Sc, Y, Nd, Yb, Er, Gd, Sm and Dy, B represents at least one type of atom selected from the group consisting of Ba, Sr and Ca, and C represents at least one type of atom selected from the group consisting of Co, Fe, Ni, Ce, Zr and Cr, and x, y, z, u, v and δ are the numbers that satisfy the following formulae:

$$0.02 \leq x \leq 0.4 \quad (i)$$

$$0.25 \leq y \leq 0.5 \quad (ii)$$

$$0.90 \leq z \leq 1.05 \quad (iii)$$

$$0 \leq u \leq 0.5 \quad (iv)$$

and $$v = 1.0,$$

and at a temperature of 1000° C. in the open air, $$2.97 \leq \delta \leq 3.04.$$

According to the present invention, furthermore, there is provided a solid oxide fuel cell in which an air electrode is provided on one surface of a solid electrolyte and a fuel electrode is provided on the other surface thereof, wherein said air electrode comprises a perovskite-type composite oxide of a composition represented by the following formula $$(La_{1-x-y}A_xB_y)_z(Mn_{1-u}C_u)_vO_\delta \quad (Ic)$$

wherein A represents at least one type of atom selected from the group consisting of Sc, Y, Nd, Yb, Er, Gd, Sm and Dy, B represents at least one type of atom selected from the group consisting of Ba, Sr and Ca, and C represents at least one type of atom selected from the group consisting of Mg, Zn, Sb and Al, and x, y, z, u, v and δ are the numbers that satisfy the following formulae:

$$0.02 \leq x \leq 0.4,$$

$$0.25 \leq y \leq 0.5,$$

$$0.90 \leq z \leq 1.05,$$

$$0 \leq u \leq 0.3,$$

and $$v = 1.0,$$

and at a temperature of 1000° C. in the open air, $$2.97 \leq \delta \leq 3.04.$$

In the fuel cell, the perovskite type composite oxide should contain Si and Al as impurities in amounts of smaller than 300 ppm, respectively, and other metal impurities in amounts of smaller than 500 ppm, respectively, the total amounts of metal impurities not exceeding 2000 ppm. Furthermore, the perovskite type composite oxide should have an average pore size of from 1 to 5 μm, an open porosity of 15 to 45%, and an average grain size of 3 to 25 μm.

DETAILED DESCRIPTION OF THE PREFERRED EMBODIMENT

Figure 1:
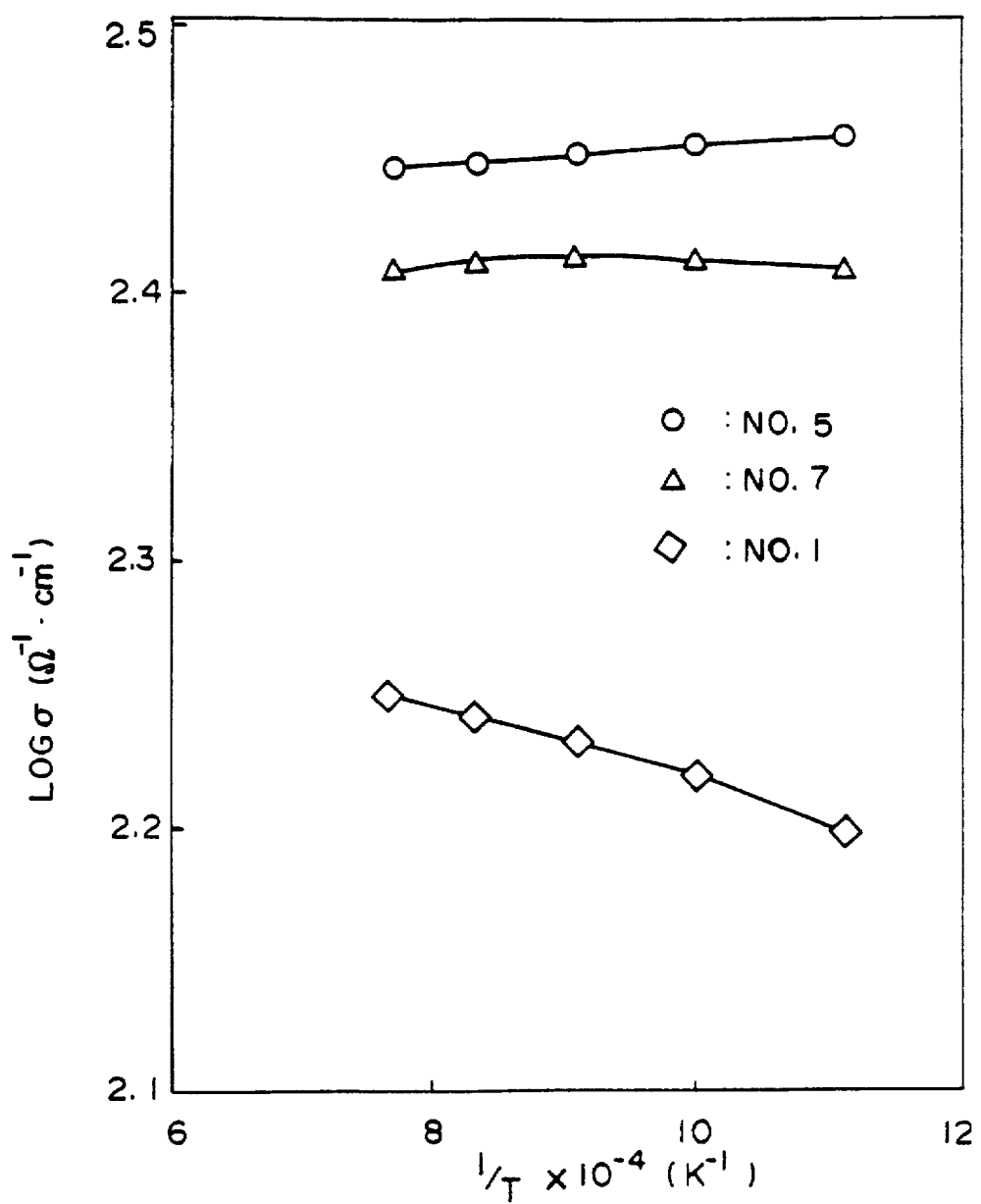
FIG. 1 is a diagram showing the electrical conductivity of an electrically conducting ceramic that varies depending upon the temperature according to an embodiment.

Perovskite type composite oxides are generally expressed by the formula $$A_nB_mO_3 \quad (II)$$

and those in which n=1 and m=1 are called stoichiometric ones and those in which n≠1 and m≠1 are called nonstoichiometric ones.

In the electrically conducting ceramic of the present invention, part of La in the A-site is substituted by the combination of a trivalent metal selected from the group consisting of Sc, Y, Nd, Yb, Er, Gd, Sm and Dy with divalent metal selected from the group consisting of Ba, Sr and Ca.

In the present invention, the values x and y of the aforementioned formula (I) are limited within the above-mentioned ranges because of the reason that when the value x is smaller than 0.02 or when the value y is smaller than 0.1, the electrical conductivity is not improved and when the value x is greater than 0.5 or when the value y is smaller than 0.6, phases different from perovskite are precipitated to deteriorate the properties.

In the electrically conducting ceramic of the present invention, furthermore, up to 50% of Mn in the B-site can be substituted by a transition metal selected from the group consisting of Co, Fe, Ni, Ce, Zr, Mg, Al, Sb and Cr. The electrical conductivity decreases as the ratio of substitution exceeds 50%.

In the electrically conducting ceramic of the present invention, the ratio of the A-site to the B-site is not necessarily limited to 1:1, but the value z representing the ratio may be at least 0.9 and not more than 1.05. When the value z becomes smaller than 0.9 or exceeds 1.05, however, a different phase precipitates and properties are not improved.

In the ceramic of the present invention, desired ranges are $0.05 \leq x \leq 0.5$, $0.2 \leq y \leq 0.5$, $0.95 \leq z \leq 1$, $0 \leq u \leq 0.3$, and $v=1$.

According to the present invention, when part of La in the $LaMnO_3$-type perovskite composite oxide is substituted by a divalent metal such as Ca, Ba or Sr and, at the same time, by an element of the group IIIa such as Y, Yb, the amount of substitution of an element of the Group IIa for La can be increased up to 60% from the conventional upper limit of about 30%.

In the present invention, La is a trivalent metal. When it is partly substituted by an alkaline earth metal (of a group IIa of the periodic table) such as Ba, Sr and Ca which are divalent metals, a hall is formed in the ceramic composition due to the difference in valence number between La and the alkaline earth metals. The formation of the hall increases electroconductivity. However, as already mentioned, when La is simply substituted by Ba, Sr, or Ca, these metals have poor solid solubility. When they are substituted by at least 30%, a crystalline phase different from the perovskite-type is formed, and the required electroconductivity cannot be increased. When in the present invention, a specified rare earth element (group IIIa of the periodic table) such as Y or Sc is substituted simultaneously with the alkaline earth metal, this simultaneous substitution can increase the amount of solid solution of the alkaline earth metal without adversely affecting the construction of the perovsikite-type crystalline phase, and as a result, the electroconductivity can be increased.

The rare earth elements to be substituted can preferably be elements which can maintain a trivalent stable bonding in the ceramics.

With reference to the rare earth elements, Ce does not fully have stability of solid solution as compared with the rare earth elements selected in this invention such as Sc, Y, or Yb (metastable phase). In addition, since Ce can exist in a valency of 3 and in a valency of 4, Ce in a valency of 4 is more stable and its use is not preferred.

When tetravalent substituted Ce is present in the ceramics, the difference (trivalent or tetravalent) in the valent number between La and Ce contrarily forms a surplus electron. The hole formed by the substitution of the alkaline earth element is negated by the formed electron.

In fact, the ceramics sintered body in which Ce is substituted has high electroconductivity in the early period, but as the elapsing of the time, a $CeO_2$ phase which is insulative and is different from a $LaMnO_3$ phase is gradually precipitated and impede electroconductivity.

The perovskite-type complex oxide sintered body of this invention shows excellent conductivity as a result of forming the above-mentioned holes. This is clearly shown from the temperature dependency of the electroconductivity in FIG. 1.

It will further be understood from FIG. 1 that the electrical conductivity changes less with temperature when a trivalent element is substituted in addition to a divalent element than when a divalent element only is substituted (compare sample No. 1 with samples Nos. 5, 7).

Figure 2:
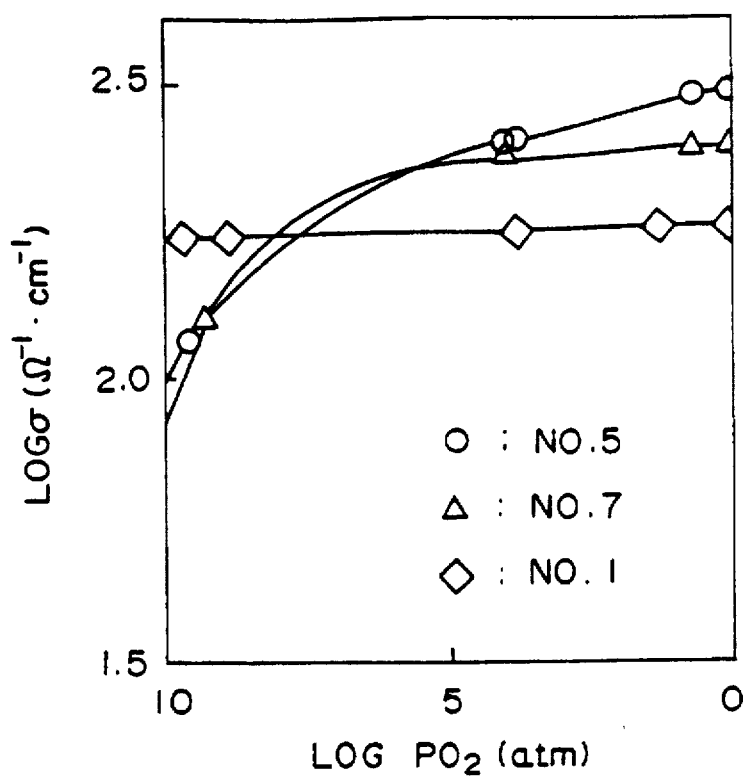
FIG. 2 is a diagram showing the electrical conductivity of the electrically conducting ceramic that various depending upon the partial pressure of oxygen according to the embodiment.

Referring to FIG. 2, furthermore, it will be understood that a stable and high electrical conductivity is exhibited even under a high partial pressure of oxygen.

The electrically conducting ceramic of the present invention can be used for the air electrode of fuel cells as well as for electrodes in a variety of electrochemical apparatuses.

Figure 3:
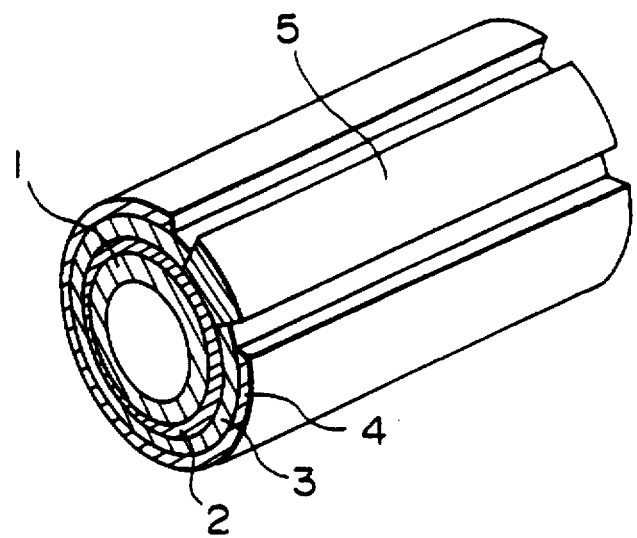
FIG. 3 is a diagram for explaining the structure of a tubular type fuel cell.
Figure 4:
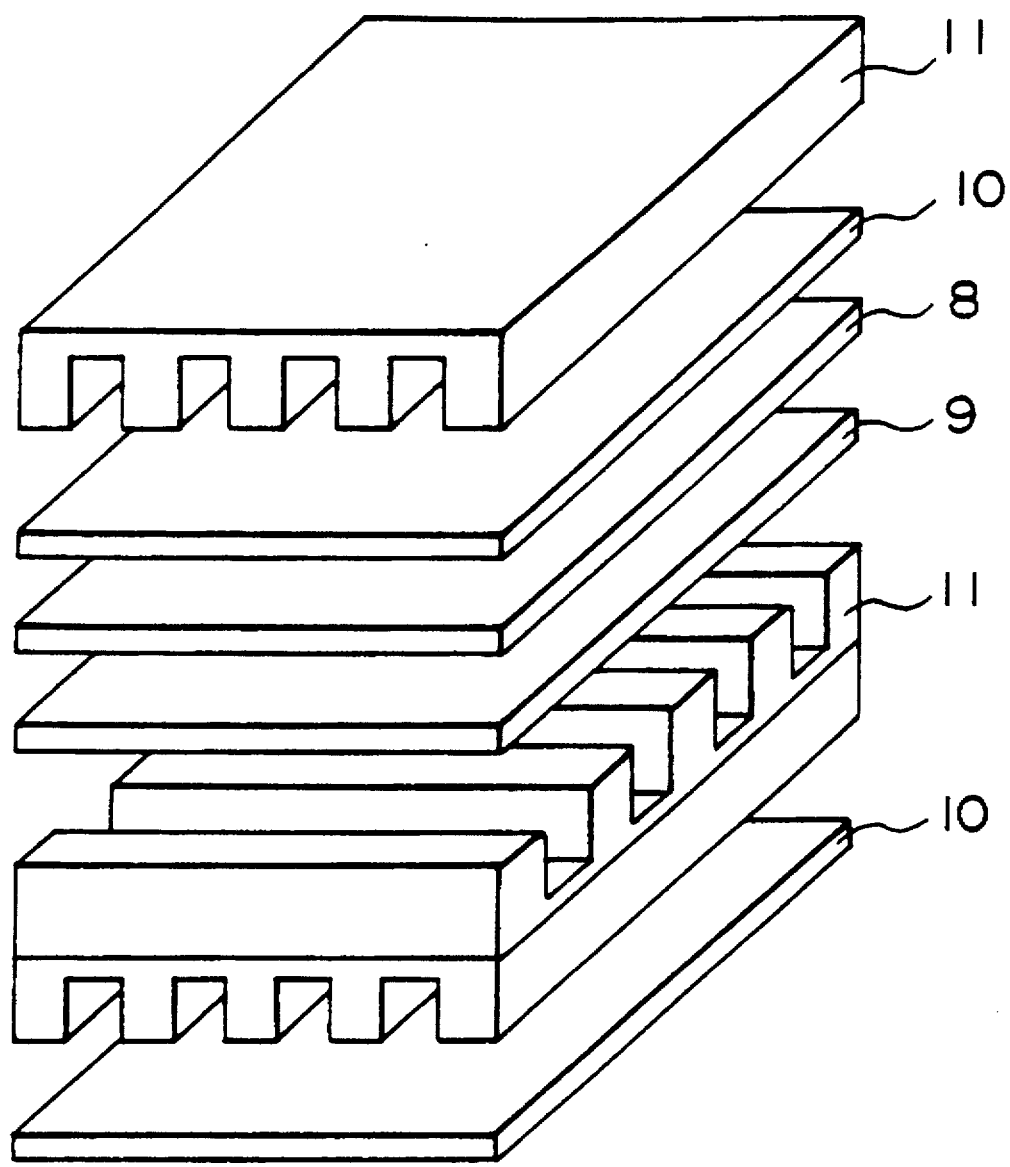
FIG. 4 is a diagram for explaining the structure of a planar type fuel cell.
Figure 5:
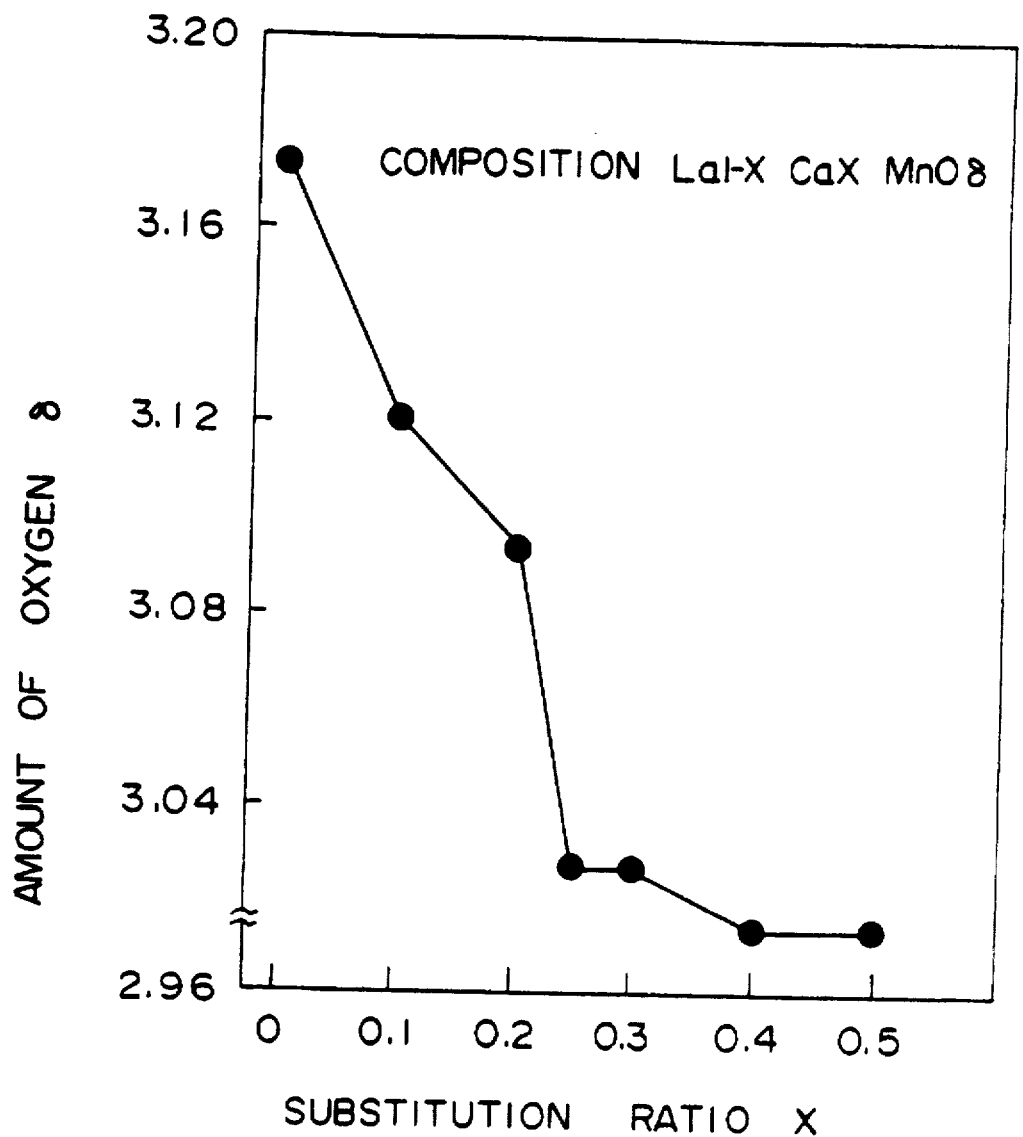
FIG. 5 is a diagram illustrating a relationship between ratio of substitution (y) of Ca and the amount of oxygen.

The solid oxide fuel cell of the present invention can be realized in either the tubular type as show in FIG. 3 or the planar type as shown in FIG. 4. The air electrode made of a composition represented by the formula Ib and Ic is usually porous and can be used in the tubular type fuel cell as a support tube that also functions as the air electrode.

In studying the application of the $LaMnO_3$-type perovskite composite oxide to the air electrode, the present inventors have discovered the following interesting facts.

The inventors therefore have forwarded the study by giving attention to the defect structure in the $LaMnO_3$ solid solution and have discovered the fact that when the substitution ratio of Ca or Sr based on La is smaller than 25 atomic %, oxygen is trapped in the crystals in the open air due to the reaction of the following formula

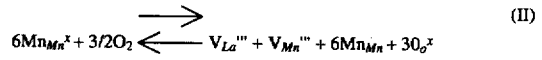 (II)

$$6Mn_{Mn}^x + 3/2O_2 \rightleftarrows V_{La}''' + V_{Mn}''' + 6Mn_{Mn}^. + 3O_o^x$$

wherein $Mn_{Mn}^x$ is a trivalent Mn ion, $V_{La}'''$ is an La ion vacancy, $V_{MN}'''$ is an Mn ion vacancy, $Mn_{Mn}^.$ is a tetravalent Mn ion $O_o^x$ is an oxygen ion at a lattice point, and $O_2$ is an oxygen gas, and the electrically neutral condition is maintained in the crystals, whereby cation vacancies of La and Mn are dominantly formed.

When the substitution ration becomes greater than 25 atomic %, on the other hand, oxygen escapes from the crystals due to the reaction of the following formula

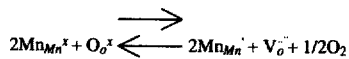

$$2Mn_{Mn}^x + O_o^x \rightleftarrows 2Mn_{Mn}^. + V_o^{..} + 1/2O_2$$

wherein $V_o$ is an oxygen ion vacancy and $M_{Mn}'$ is a divalent Mn ion, and the oxygen ion vacancies are formed.

From the above results, the concentration of cation vacancies is greater in the $LaMnO_3$-type solid solution in which the substitution ratio of Ca or Sr based on La is smaller than 25% based on the $LaMnO_3$-type solid solution which has a larger substitution ratio than the above, and it is expected that the cations (La, Mn) are diffused at a considerably large rate through the cation vacancies.

In the ceramic materials, sintering is generally rate-determined by an ion having a slower diffusion rate out of an anion and a cation. The diffusion of perovskite oxides gives an anticipation that in the $LaMnO_3$ crystals, the diffusion rate of the cation is smaller than that of the anion. When the above-mentioned general law relating to sintering is applied to $LaMnO_3$, it can be anticipated that the sintering speed of a LaMnO₃ solid solution having a lattice defect structure of formula (III) is smaller than that of a LaMnO₃ solid solution having a lattice defect structure (II).

A hollow tube having an outer diameter of 16 mm and an inner diameter of 13 mm and an open porosity of 30 to 32% using a LaMnO₃ solid solution having varying amounts of Ca and Sr dissolved in the solid solution is prepared, annealed at 1000° C. in an atmosphere for 1000 hours, and the dimensional changes of the outer diameter before and after heat treatment are measured. It is found as a result that when the substitution ratio of Ca or Sr is smaller than 25 atomic% based on La, the dimensional change was large. This shows that when the substitution ratio of Ca or Sr is smaller than 25 atomic%, the sintering of the material is enhanced by the Mn or La ion vacancy.

When CaO or SrO is solid-dissolved at a high concentration, however, the coefficient of thermal expansion differs greatly from that of the solid electrolyte and becomes a cause of thermal stress when the cell is constructed. In particular, when the difference in the coefficient of thermal expansion exceeds 10% between the two, the thermal stress generates and causes the cell to be destroyed.

According to the present invention, however, it was discovered that there is obtained an LaMnO₃ solid solution which has a defect structure represented by the formula (III) and the coefficient of thermal expansion that matches the solid oxide well by substituting part of La in the LaMnO₃-type material in which is solid-dissolved SrO or CaO by a rare earth element such as Y, Yb or the like that has the same valency as La and an ion size smaller than La. Even in the nonstoichiometric system in which the A-site is missing in the perovskite structure, it was confirmed that the same results were obtained since the defect structure is resembling that of the stoichiometric system.

This can prevent the deformation of the cell and the decrease of output during the system operation in the tubular type fuel cell. Furthermore, in the planar type fuel cell, a poor connection between cells by the peeling of the air electrode and the cell deformation can be dissolved. As a result, the present invention can provide a fuel cell having stability for a long period of time and a stable output in tubular type and flat type fuel cells. In the planar type fuel cell, furthermore, the air electrode is often used as a gas diffuser. Even in this case, the gas diffuser shrinks little and maintains excellent connection to the solid electrolyte. As a result, the output during the generation of power is not decreased by the defective connection.

Furthermore, the air electrode according to the present invention exhibits excellent anticreeping property at high temperatures and deforms little when a solid oxide and an interconnector are formed on the surface thereof, contributing to enhancing the efficiency percentage of cells.

The present inventors have further measured the amount of oxygen in the LaMnO₃ solid solutions in which CaO has been solid-dissolved in changing amounts after they were annealed in the open air at a temperature of 1000° C. for 200 hours and were quickly quenched by being thrown into the water; The results were as shown in FIG. 6, from which it is obvious that the amount of oxygen in the crystals suddenly changes when the substitution ratio of Ca is 0.25. The result tells that cation vacancies of La and Mn are dominantly formed when the amount $\delta$ of oxygen is greater than 3.04 and that oxygen ion vacancies are dominantly formed when the amount $\delta$ of oxygen is smaller than 3.04, the diffusion rate of cations is small since the concentration of cation vacancies of La and Mn is low and, as a result, it is considered that the rate of densification is suppressed.

As for the densification, furthermore, impurities can be regarded to be more important factor. Impurities of very small amounts are solid-dissolved in the crystals and do not affect the properties. As a predetermined amount is exceeded, however, the impurities segregate on the grain boundaries or a glass phase is formed on the grain boundaries. Therefore, the diffusion of cations on the grain boundaries is promoted and, as a result, the sintering are accelerated. According to the present invention, the amount of impurities is limited to the aforementioned range as a result of the above discovery.

In the oxygen electrode of the fuel cell of the present invention, the values x, y, z, u and v are limited within the above-mentioned ranges because of the reason that when the value x representing the amount of substitution of Y, Yb, Sc, Er, etc. for La is greater than 0.4, lattice distortion develops in the crystals due to a difference in the diameter of ions between La and Y, Yb, Sc, Er whereby the energy of activation of the cation diffusion decreases, the diffusion coefficient increases, and the shrinking due to sintering increases.

Moreover, the shrinking takes place to a great extent when x=0 and y is smaller than 0.25. The shrinking, however, does not take place when the value y is greater than 0.25. In a system containing a divalent metal such as Ca in large amounts, however, the coefficient of thermal expansion does not match the solid electrolyte as mentioned earlier.

When the value y representing the amount of substitution of Ca, Sr or Ba for La is smaller than 0.25, on the other hand, formation of cation vacancies is not suppressed, and the shrinking due to sintering takes place to a great degree. As the value y exceeds 0.50, on the other hand, it becomes necessary to increase the firing temperature to be higher than 1600° C. which is not economical. With the firing being effected at a low temperature, the sintering becomes poor and it is not allowed to obtain a material having a predetermined open porosity.

With the perovskite crystal structure, furthermore, the ratio z at which the atoms exist in the A-site and the B-site is usually 1, but the similar effect is recognized even in the solid solution of the nonstoicheometric system in which the value z decreases down to 0.9. This is because, the defect structure resembles that of the stoicheometric system. As the value z becomes smaller than 0.9, however, the shrinking due to sintering increases. This is because, a different phase containing Mn such as of Mn₃O₄ other than the perovskite type is precipitated, and the shrinking are promoted. When the value z exceeds 1.05, on the other hand, La₂O₃ is precipitated and the material is weathered within short periods of time.

Even when Mn is substituted by Co, Ni, Zr, Ce, Fe or the like with the LaMnO₃-type solid solution as a base, the defect structure does not change substantially. However, the sintering rates of the LaFeO₃-type and LaCoO₃-type solid solutions are greater than that of the LaMnO₃-type solid solution. This means that the coefficient of cation diffusion in the solid solution such as of LaFeO₃ or LaCoO₃ is greater than that of LaMnO₃.

Accordingly, when Mn is substituted by Fe, Co, Ni, Zr, Ce or Cr, the diffusion rate of cations in the system becomes great as the amount of substitution exceeds 0.5, and whereby the sintering takes place and the shrinkage increases.

As a substituting element for Mn, Mg, Zn, Sb and Al have a large diffusion speed of a cation than the above-mentioned elements, and therefore, the upper limit of their substitution becomes 0.3.

In the fuel cell of the present invention, the composition of the oxygen electrode should be such that the values x, y, z, u, v and δ in the aforementioned formula (Ib) satisfy the following formulae:

$0.02 \leq x \leq 0.3$, $0.25 \leq y \leq 0.4$, $0.95 \leq z \leq 1.00$, $0 \leq u \leq 0.2$, and $v = 1.0$ and at a temperature of 1000° C. in the open air, $2.97 \leq \delta \leq 3.04$.

furthermore, in the formula (I$_c$), x, y, z, u, v and are preferably within the following ranges $0.02 \leq x \leq 0.3$, $0.25 \leq y \leq 0.4$, $0.95 \leq z \leq 1.0$, $0 \leq u \leq 0.2$, and $v = 1.0$ and at a temperature of 1000° C. in the open air, $2.97 \leq \delta \leq 3.04$.

from the standpoint of matching the thermal expansion to the solid oxide such as the stabilized $ZrO_2$.

Moreover, as the amount of oxygen exceeds 3.04, formation of cation vacancies in the crystals is not suppressed, and the shrinkage tends to take place to a great degree upon firing.

Moreover, shrinkage of the material is affected even by the impurities in the material. The firing and shrinkage of the material are promoted when the amounts of impurities in the material exceed 300 ppm reckoned as metal components such as Si and Al, respectively. Moreover, the firing and shrinkage are promoted even when the amounts of other impurities such as Zr, Fe, Ti, etc. exceed 2000 ppm in total amount. The amounts of Zr, Fe and Ti should be smaller than 500 ppm, respectively. Particularly preferred ranges are that Si and Al should be smaller than 200 ppm, respectively, other impurities should be smaller than 300 ppm, respectively, and the total amount of impurities should be smaller than 1000 ppm.

When constructed in the tubular type as shown in FIG. 3, the solid oxide fuel cell of the present invention has the air electrode 2 formed on the support tube 1 which is made of a porous tube, and further has the solid oxide 3 and the fuel electrode 4 formed thereon. When the electric power is to be generated by the cell of the above structure, a gas containing oxygen such as the air is fed into the support tube 1 of the tubular shape and a fuel gas such as a hydrogen gas is fed to the side of the fuel electrode 4, whereby the oxygen gas is fed to the air electrode 2 through the porous support tube 1 and the electric power is generated between the air electrode 2 and the fuel electrode 4. The air electrode 2 and the fuel electrode 4 are made of porous materials having open porosities of 15 to 40% such that the gases can be fed to the solid oxide. Further, the fuel cell module is constituted by a plurality of cells that are connected together via interconnectors 5.

In the fuel cell of the present invention, the support tube 1 is constituted by a porous material having a porosity of 30 to 45% composed of $ZrO_2$ that contains at least one of CaO and MgO in an amount of 10 to 20 mol% and, particularly, in an amount of 13 to 17 mol% or composed of $ZrO_2$ that contains at least one of $Y_2O_3$ and $Yb_2O_3$ in an amount of 3 to 20 mol% and, particularly, in an amount of 8 to 15 mol%. The solid oxide 3 is constituted by a known stabilized $ZrO_2$ that contains a stabilizing agent such as $Y_2O_3$, and the fuel electrode 4 is constituted by an Ni-zirconia or the like to which only, however, the invention is in no way limited.

The air electrode may be provided on the above porous tube or may also serve as the porous support tube. In either case, the open porosity should lie over a range of from 15 to 45%. When the open porosity is smaller than 15%, the amount of gas permeation is so small that the power generating performance is not obtained to a sufficient degree. When the amount of gas permeation exceeds 45%, on the other hand, the mechanical strength tends to decrease. When the air electrode also serves as the support tube, in particular, it becomes difficult to handle the air electrode during the step of preparing the cell.

As the average pore size of the air electrode becomes smaller than 3μm as measured by the mercury intrusion porosity method, furthermore, the amount of gas permeation becomes so small that the power generating performance is not often obtained to a sufficient degree. When the pore size exceeds 5 μm, on the other hand, the electrical conductivity of the air electrode itself becomes so poor that the power generating performance tends to decrease. When the air electrode is to be used as the support electrode, the upper limit of the pore size should be 4 μm. When the pore size is greater than this, the support tube may lack strength.

Moreover, the average grain size of the composite oxide should range from 3 to 25 μm. When the average grain size is smaller than 3 μm, the amount of gas permeation is so small that the power generating performance is not obtained to a satisfactory degree. When the average grain size exceeds 25 μm, on the other hand, the electrode lacks the strength. When the electrode is used as a support tube, in particular, cumbersome handling is required during the step of fabricating the cell.

The electrically conducting ceramic of the present invention is prepared by homogeneously mixing the components at ratios that satisfy the aforementioned formula (I), (Ib) or (Ic), subjecting the mixture to the solid-state reaction at a high temperature, finely pulverizing the reaction product, and molding the powder thereof into any desired shape followed by firing.

Oxides and carbonates of various metal elements can be used as starting components. In particular, the metal components of the Group IIa such as Ca, Sr and Ba should be used in the form of carbonates and other metal components should be used in the form of oxides.

It is desired to use a ball mill for mixing the components or for pulverizing the solid-state reaction product, and zirconia balls and the like are used as the balls. The solid-state reaction should be carried out at a temperature of from 1100° to 1550° C. for 1 to 5 hours.

The molding into the electrode can be effected at any stage. For instance, the powder of the solid-state reaction product can be molded under the application of pressure. As desired, in this case, a molding assistant such as polyhydric alcohol or the like can be used.

Moreover, a slurry or a paste of the solid-state reaction product can be provided on the surface of the solid oxide molded article by such means as the slurry-dip method, screen printing method or the coating method.

The firing can be carried out at a temperature of from 100° to 1400° C. for a period of from 2 to 5 hours.

As other methods, known chemical vapor deposition method and known physical valor deposition method such as vacuum evaporation and sputtering may be used.

EXAMPLES

The invention will now described by way of the following working examples.

EXAMPLE 1

Starting materials of the powders of $La_2O_3$, $Y_2O_3$, $CaCO_3$, $BaCO_3$, $SrCO_3$, $Yb_2O_3$, $Sc_2O_3$, $Nd_2O_3$, $Er_2O_3$, $Gd_2O_3$, $Dy_2O_3$, $Sn_2O_3$, $Sb_2O_3$, $Mn_2O_3$, $CoO$, $Fe_2O_3$, $ZrO_2$, $NiO$, $MgO$, $Al_2O_3$ and $Cr_2O_3$ were weighed and mixed in such a manner that the values x, y, z, u and v in the above formula 1 were at a ratio of Tables 1 and 2. The mixture was annealed at 1100° C. and was solid-state reacted. The reaction product was then admixed with a binder and was molded under the application of pressure followed by firing at 1300° to 1700° C. in the open air.

The obtained sintered product was identified for its crystal phase by the X-ray diffraction measurement and was measured for its electrical conductivity. The electric conductivity was measured by using a prism-like molded article relying upon a DC four probe method in the open air at a temperature of 1000° C. The results were as shown in Tables 1 and 2. As for the samples Nos. 1, 5 and 7, furthermore, the dependence of electrical conductivity upon the oxygen partial pressure was examined at a temperature of 1000° C. while changing the partial pressure of oxygen over a range of from $10^{-1}$ to 1 atm. The results were as shown in FIG. 2. The dependence of electrical conductivity upon the temperature was also examined while changing the temperature over a range of from 600° C. to 1000° C. The results were as shown in FIG. 1.

TABLE 1

| Sample No. | $(La_{1-x-y}A_xB_y)_z(Mn_{1-u}C_u)_vO_\delta$ | | | | | Electrical conductivity in the open air ($\Omega^{-1}cm^{-1}$) | Crystal phase |
|---|---|---|---|---|---|---|---|
| | $A_x$ | | $B_y$ | z | $C_u$ | v | |
| 1-*1 | — | — | Ca | 0.2 | 1.0 | — | 1.0 | 180 | Perovskite |
| 1-*2 | — | — | Ca | 0.5 | 1.0 | — | 1.0 | 160 | Perovskite, $CaMn_2O_4$ |
| 1-3 | Y | 0.02 | Ca | 0.5 | 1.0 | — | 1.0 | 220 | Perovskite |
| 1-4 | Y | 0.1 | Ca | 0.5 | 1.0 | — | 1.0 | 280 | Perovskite |
| 1-5 | Y | 0.2 | Ca | 0.5 | 1.0 | — | 1.0 | 240 | Perovskite |
| 1-6 | Y | 0.3 | Ca | 0.5 | 1.0 | — | 1.0 | 220 | Perovskite |
| 1-7 | Y | 0.4 | Ca | 0.5 | 1.0 | — | 1.0 | 210 | Perovskite |
| 1-8 | Y | 0.5 | Ca | 0.5 | 1.0 | — | 1.0 | 200 | Perovskite |
| 1-*9 | Y | 0.18 | — | | 1.0 | — | 1.0 | 130 | Perovskite |
| 1-10 | Y | 0.18 | Ca | 0.1 | 1.0 | — | 1.0 | 210 | Perovskite |
| 1-11 | Y | 0.16 | Ca | 0.2 | 1.0 | — | 1.0 | 210 | Perovskite |
| 1-12 | Y | 0.12 | Ca | 0.4 | 1.0 | — | 1.0 | 260 | Perovskite |
| 1-13 | Y | 0.22 | Ca | 0.45 | 1.0 | — | 1.0 | 230 | Perovskite |
| 1-14 | Y | 0.16 | Ca | 0.6 | 1.0 | — | 1.0 | 210 | Perovskite |
| 1-*15 | Y | 0.16 | Ca | 0.7 | 1.0 | — | 1.0 | 190 | Perovskite, $CaMn_2O_4$ |
| 1-16 | Y | 0.1 | Ca | 0.5 | 1.05 | — | 1.0 | 205 | Perovskite |
| 1-17 | Y | 0.1 | Ca | 0.5 | 0.95 | — | 1.0 | 285 | Perovskite |
| 1-*18 | Y | 0.1 | Ca | 0.5 | 1.10 | — | 1.0 | 170 | Perovskite, $La_2O_3$ |
| 1-19 | Y | 0.1 | Ca | 0.5 | 0.90 | — | 1.0 | 210 | Perovskite |
| 1-*20 | Y | 0.1 | Ca | 0.5 | 0.85 | — | 1.0 | 190 | Perovskite, $Mn_2O_3$ |
| 1-21 | Yb | 0.1 | Ca | 0.5 | 1.0 | — | 1.0 | 270 | Perovskite |
| 1-22 | Y | 0.1 | Sr | 0.5 | 1.0 | — | 1.0 | 280 | Perovskite |
| 1-23 | Y | 0.1 | Ba | 0.5 | 1.0 | — | 1.0 | 270 | Perovskite |
| 1-24 | Sm | 0.1 | Ca | 0.5 | 1.0 | — | 1.0 | 260 | Perovskite |

Samples marked with * lie outside the scope of the invention.

TABLE 2

| Sample No. | $(La_{1-x-y}A_xB_y)_z(Mn_{1-u}C_u)_vO_\delta$ | | | | | | | Electrical conductivity in the open air ($\Omega^{-1}cm^{-1}$) | Crystal phase |
|---|---|---|---|---|---|---|---|---|---|
| | $A_x$ | | $B_y$ | z | $C_u$ | | v | | |
| 1-25 | Y | 0.1 | Ca | 0.5 | 1.0 | Co | 0.2 | 1.0 | 295 | Perovskite |
| 1-26 | Y | 0.1 | Ca | 0.5 | 1.0 | Co | 0.3 | 1.0 | 285 | " |
| 1-27 | Y | 0.1 | Ca | 0.5 | 1.0 | Co | 0.5 | 1.0 | 260 | " |
| 1-28 | Y | 0.3 | Ca | 0.5 | 1.0 | Co | 0.2 | 1.0 | 240 | " |
| 1-29 | Y | 0.5 | Ca | 0.5 | 1.0 | Co | 0.2 | 1.0 | 220 | " |
| 1-30 | Y | 0.16 | Ca | 0.5 | 1.0 | Co | 0.2 | 1.0 | 225 | " |
| 1-31 | Y | 0.1 | Ca | 0.5 | 1.0 | Fe | 0.2 | 1.0 | 260 | " |
| 1-32 | Y | 0.1 | Ca | 0.5 | 1.0 | Zr | 0.2 | 1.0 | 280 | " |
| 1-33 | Y | 0.1 | Ca | 0.5 | 1.0 | Ni | 0.2 | 1.0 | 290 | " |
| 1-34 | Y | 0.1 | Ca | 0.5 | 1.0 | Ce | 0.2 | 1.0 | 280 | " |
| 1-35 | Yb | 0.1 | Ca | 0.5 | 1.0 | Co | 0.2 | 1.0 | 280 | " |
| 1-*36 | Yb | 0.1 | Ca | 0.5 | 1.0 | Ni | 0.2 | 1.0 | 280 | " |
| 1-37 | Y | 0.1 | Sr | 0.5 | 1.0 | Co | 0.2 | 1.0 | 295 | " |
| 1-38 | Y | 0.1 | Sr | 0.5 | 1.0 | Ni | 0.2 | 1.0 | 295 | " |
| 1-39 | Y | 0.1 | Ba | 0.5 | 1.0 | Co | 0.2 | 1.0 | 280 | " |

TABLE 2-continued

| Sample No. | $(La_{1-x-y}A_xB_y)_z(Mn_{1-u}C_u)_vO_\delta$ | | | | | | | Electrical conductivity in the open air ($\Omega^{-1}cm^{-1}$) | Crystal phase |
|---|---|---|---|---|---|---|---|---|---|
| | $A_x$ | | $B_y$ | | z | $C_u$ | | v | |
| 1-40 | Y | 0.1 | Ba | 0.5 | 1.0 | Co | 0.2 | 1.0 | 280 | " |
| 1-41 | Sc | 0.1 | Ca | 0.5 | 1.0 | Co | 0.2 | 1.0 | 275 | " |
| 1-42 | Nd | 0.1 | Ca | 0.5 | 1.0 | Co | 0.2 | 1.0 | 260 | " |
| 1-43 | Er | 0.1 | Ca | 0.5 | 1.0 | Co | 0.2 | 1.0 | 245 | " |
| 1-44 | Cd | 0.1 | Ca | 0.5 | 1.0 | Co | 0.2 | 1.0 | 265 | " |
| 1-45 | Dy | 0.1 | Ca | 0.5 | 1.0 | Co | 0.2 | 1.0 | 230 | " |
| 1-46 | Y | 0.1 | Ca | 0.5 | 1.0 | Mg | 0.2 | 1.0 | 270 | " |
| 1-47 | Y | 0.1 | Ca | 0.5 | 1.0 | Al | 0.2 | 1.0 | 275 | " |
| 1-48 | Y | 0.1 | Ca | 0.5 | 1.0 | Cr | 0.2 | 1.0 | 220 | " |
| 1-49 | Y | 0.1 | Ca | 0.5 | 1.0 | Sb | 0.2 | 1.0 | 240 | " |
| 1-50 | Sm | 0.1 | Ca | 0.5 | 1.0 | Ni | 0.2 | 1.0 | 235 | " |

As shown in Tables 1 and 2 above, the products of the present invention exhibited electrical conductivities that were greater by about 1.6 times than those of the conventional electrically conducting ceramic (samples Nos. 1 and 2), i.e., exhibited electrical conductivities that were greater than 200 $\Omega^{-1} \cdot cm^{-1}$. From FIG. 1, furthermore, the electrical conductivity did not decrease even at temperatures lower than 1000° C. and from FIG. 2, it is comprehended that the products of the present invention exhibit electrical conductivities that are more stable than that of the prior produces in an oxygen-rich atmosphere including the open air.

EXAMPLE 2

Starting materials of the commercially available powders of $La_2O_3$, $Y_2O_3$, $Yb_2O_3$, $Sc_2O_3$, $Er_2O_3$, $Gd_2O_3$, $Sm_2O_3$, $Dy_2O_3$, $Nd_2O_3CaCO_3$, $SrCO_3$, $BaCO_3$, $Mn_2O_3$, NiO, $Fe_2O_3$, CoO, $ZrO_2$, $CeO_2$, $Cr_2O_3$ and FeO having a purity of 99.9% were mixed to obtain composition shown in Tables 3 and 4, which were mixed using zirconia balls for 10 hours, and were subjected to the solid-state reaction at 1300° C. for 10 hours. The powders were further pulverized for another 10 hours using zirconia balls, and were then molded into cylinders having an outer diameter of 14 mm, an inner diameter of 10 mm and a length of 100 mm, followed by firing at 1470° to 1500° C. to obtain tubular sintered products.

The obtained sintered products were measured for their open porosities to be 25 to 35% relying upon the Archimedes' method. The average grain size was 7 to 10 μm. Thereafter, the tubular sintered tube was maintained at 1000° C. in an atmospheric air for 2000 hours by using an electric furnace. At this time, the dimensional change of the outer diameter of the tubular sintered tube is measured before and after the heat treatment. The shrinkage of the sintered tube was calculated by the following formula.

Shrinkage (%) = ((outer diameter of before heat treatment − outer diameter of after heat treatment)/outer diameter of before heat treatment) × 100

The results were as shown in Tables 3 and 4.

Furthermore, a commercially available 8 mol% $Y_2O_3$/92 mol% $ZrO_2$ powder (hereafter called YSZ) was molded into a disc having a diameter of 20 mm and a thickness of 0.5 mm, in order to obtain a sintered product thereof having a theoretical density ratio of 99%. Pastes of compositions of Tables 3 and 4 were screen-printed on the surface of the YSZ disc, dried, and annealed at 1200° C. for 2 hours, such that the starting material powders were baked on the surface of YSZ maintaining a thickness of about 20 μm.

This sample was held in an atmospheric air at 1000° C. for 2000 hours using an electric furnace. Thereafter, it was cooled to room temperature at a rate of 100° C./hour, and the fired powder was examined to investigate its peeling state. The results were as shown in Tables 3 and 4, in which those that peeled are marked with X and those which did not peel are marked with a circle.

TABLE 3

| Sample No. | $(La_{1-x-y}Y_xCa_y)_zMnO_\delta$ | | | Shrinkage (%) | Open porosity (%) | Peeling |
|---|---|---|---|---|---|---|
| | x | y | z | | | |
| 2-*1 | — | 0.20 | 1.0 | 1.84 | 31 | X |
| 2-*2 | 0.05 | 0.20 | 1.0 | 1.76 | 28 | X |
| 2-3 | 0.01 | 0.25 | 1.0 | 0.11 | 25 | O |
| 2-4 | 0.02 | 0.25 | 1.0 | 0.10 | 27 | O |
| 2-5 | 0.05 | 0.25 | 1.0 | 0.07 | 27 | O |
| 2-6 | 0.05 | 0.30 | 1.0 | 0.08 | 28 | O |
| 2-7 | 0.05 | 0.40 | 1.0 | 0.08 | 30 | O |
| 2-8 | 0.05 | 0.50 | 1.0 | 0.21 | 29 | O |
| 2-*9 | 0.10 | 0.20 | 1.0 | 1.68 | 33 | X |
| 2-10 | 0.10 | 0.25 | 1.0 | 0.03 | 32 | O |
| 2-11 | 0.20 | 0.30 | 1.0 | 0.06 | 33 | O |
| 2-12 | 0.20 | 0.40 | 1.0 | 0.08 | 29 | O |
| 2-13 | 0.20 | 0.50 | 1.0 | 0.24 | 28 | O |
| 2-*14 | 0.30 | 0.20 | 1.0 | 0.94 | 35 | X |
| 2-15 | 0.30 | 0.30 | 1.0 | 0.16 | 33 | O |
| 2-16 | 0.30 | 0.40 | 1.0 | 0.20 | 32 | O |
| 2-17 | 0.30 | 0.50 | 1.0 | 0.29 | 35 | O |
| 2-18 | 0.35 | 0.50 | 1.0 | 0.21 | 32 | O |
| 2-19 | 0.40 | 0.50 | 1.0 | 0.24 | 29 | O |
| 2-*20 | 0.50 | 0.50 | 1.0 | 0.99 | 28 | X |
| 2-*21 | 0.50 | 0.40 | 1.0 | 0.88 | 32 | X |
| 2-22 | 0.10 | 0.25 | 0.95 | 0.08 | 30 | O |
| 2-23 | 0.10 | 0.25 | 0.90 | 0.19 | 33 | O |
| 2-24 | 0.20 | 0.40 | 0.90 | 0.15 | 32 | O |
| 2-*25 | 0.10 | 0.25 | 0.85 | 1.57 | 34 | X |
| 2-26 | 0.10 | 0.30 | 1.05 | 0.20 | 33 | O |

Samples marked with * lie outside the scope of the invention.

TABLE 4

| Sample No. | $(La_{1-x-y}A_xB_y)_z(Mn_{1-u}C_u)O_\delta$ | | | | | | | Shrinkage (%) | Open porosity (%) | Peeling |
|---|---|---|---|---|---|---|---|---|---|---|
| | Ax | | By | | z | Cu | | | | |
| 2-*27 | — | | Sr | 0.15 | 1.0 | — | | 1.92 | 29 | X |
| 2-28 | Y | 0.10 | Ca | 0.30 | 1.0 | Co | 0.10 | 0.08 | 31 | O |
| 2-29 | Y | 0.10 | Ca | 0.30 | 1.0 | Co | 0.20 | 0.09 | 33 | O |
| 2-30 | Y | 0.20 | Ca | 0.25 | 1.0 | Co | 0.40 | 0.21 | 30 | O |
| 2-*31 | Y | 0.20 | Ca | 0.20 | 1.0 | Co | 0.60 | 0.65 | 33 | X |
| 2-32 | Y | 0.10 | Ca | 0.30 | 1.0 | Ni | 0.10 | 0.09 | 32 | O |
| 2-33 | Y | 0.10 | Ca | 0.30 | 1.0 | Ni | 0.20 | 0.11 | 29 | O |
| 2-34 | Y | 0.10 | Ca | 0.30 | 1.0 | Ni | 0.40 | 0.24 | 30 | O |
| 2-35 | Y | 0.10 | Ca | 0.30 | 1.0 | Ni | 0.50 | 0.21 | 29 | O |
| 2-36 | Y | 0.10 | Ca | 0.30 | 1.0 | Ni | 0.60 | 0.94 | 30 | X |
| 2-37 | Y | 0.10 | Ca | 0.30 | 1.0 | Zr | 0.20 | 0.13 | 34 | O |
| 2-38 | Y | 0.10 | Ca | 0.30 | 1.0 | Ce | 0.20 | 0.10 | 29 | O |
| 2-39 | Y | 0.10 | Ca | 0.30 | 1.0 | Fe | 0.20 | 0.11 | 29 | O |
| 2-40 | Y | 0.10 | Ba | 0.30 | 1.0 | — | | 0.12 | 32 | O |
| 2-41 | Y | 0.10 | Ba | 0.30 | 1.0 | Co | 0.10 | 0.10 | 31 | O |
| 2-42 | Y | 0.10 | Sr | 0.30 | 1.0 | — | | 0.12 | 33 | O |
| 2-*43 | Yb | 0.10 | Sr | 0.20 | 1.0 | — | | 1.86 | 34 | X |
| 2-44 | Yb | 0.10 | Sr | 0.30 | 1.0 | — | | 0.08 | 31 | O |
| 2-45 | Yb | 0.10 | Sr | 0.30 | 1.0 | — | | 0.10 | 30 | O |
| 2-46 | Yb | 0.10 | Sr | 0.40 | 1.0 | — | | 0.09 | 31 | O |
| 2-47 | Sr | 0.20 | Sr | 0.50 | 1.0 | — | | 0.19 | 35 | O |
| 2-48 | Yb | 0.20 | Sr | 0.30 | 0.95 | — | | 0.08 | 35 | O |
| 2-49 | Yb | 0.10 | Ca | 0.30 | 1.0 | — | | 0.10 | 33 | O |
| 2-50 | Yb | 0.10 | Ca | 0.30 | 1.0 | Cr | 0.10 | 0.10 | 30 | O |
| 2-51 | Yb | 0.10 | Ba | 0.30 | 1.0 | — | | 0.09 | 33 | O |
| 2-52 | Yb | 0.10 | Ba | 0.30 | 1.0 | Co | 0.10 | 0.09 | 29 | O |
| 2-53 | Yb | 0.10 | Ba | 0.30 | 1.0 | Fe | 0.10 | 0.09 | 31 | O |
| 2-54 | Yb | 0.10 | Ba | 0.30 | 1.0 | Zr | 0.10 | 0.12 | 34 | O |
| 2-55 | Er | 0.10 | Sr | 0.30 | 1.0 | — | | 0.08 | 31 | O |
| 2-56 | Er | 0.10 | Ca | 0.30 | 1.0 | — | | 0.09 | 28 | O |
| 2-57 | Er | 0.10 | Ba | 0.50 | 1.0 | — | | 0.09 | 32 | O |
| 2-58 | Er | 0.10 | Ca | 0.30 | 1.0 | Ni | 0.10 | 0.12 | 32 | O |
| 2-59 | Er | 0.10 | Ca | 0.30 | 1.0 | Ce | 0.20 | 0.12 | 31 | O |
| 2-60 | Er | 0.10 | Ca | 0.30 | 1.0 | Zr | 0.20 | 0.11 | 30 | O |
| 2-61 | Sc | 0.10 | Sr | 0.30 | 1.0 | — | | 0.10 | 30 | O |
| 2-62 | Sc | 0.10 | Ca | 0.30 | 1.0 | — | | 0.08 | 27 | O |
| 2-63 | Sc | 0.10 | Ba | 0.30 | 1.0 | — | | 0.08 | 31 | O |
| 2-64 | Sc | 0.10 | Ba | 0.30 | 1.0 | Cr | 0.20 | 0.12 | 30 | O |
| 2-65 | Gd | 0.10 | Ca | 0.30 | 1.0 | — | | 0.21 | 32 | O |
| 2-66 | Sm | 0.10 | Ca | 0.30 | 1.0 | — | | 0.16 | 29 | O |
| 2-67 | Dy | 0.10 | Ca | 0.30 | 1.0 | — | | 0.14 | 28 | O |
| 2-68 | Nd | 0.10 | Ca | 0.30 | 1.0 | — | | 0.15 | 29 | O |

Samples marked with * lie outside the scope of the invention

According to Tables 3 and 4, the samples having a substitution ratio (y) of Ca which is smaller than 0.25 shrink greatly. On the other hand, the samples having a substitution ratio (y) which is greater than 0.5 sinter poorly from which it is not allowed to obtain a tubular sintered product having a desired open porosity. The samples having a substitution ratio (x) of Y of greater than 0.4 similarly shrink to a large degree. The shrinkage becomes great even when the substitution ratio (u) of Co, Ni, Fe, Zr and Ce exceeds 0.5.

With the samples having a z-value related to the (A-site atoms/B-site atoms) ratio which is smaller than 0.9, $Mn_3O_4$ is precipitated to promote the shrinking. When the Z-value exceeds 1.05, furthermore, $La_2O_3$ is precipitated and the samples are weathered within short periods of time.

Furthermore, the peeling takes place when the substitution ratio (y) of Ca, Sr and Ba is smaller than 0.25. On the other hand, the sintering becomes poor as y exceeds 0.5, and the powders are poorly baked onto the YSZ disc and are peeled during the preparation of the samples if the substitution ratio (x) of Y, Yb, Sc and Er exceed 0.4. Even when the substitution amount (u) of Co, Ni, Fe, Zr and Ce exceeds 0.5, the shrinking due to sintering is great and peeling takes place. As for the nonstoicheometry, when the z-value becomes smaller than 0.9, a different phase containing Mn or a transition metal precipitates, and the shrinking is promoted and peeling takes place.

EXAMPLE 3

The same starting materials as those of Example 2 were weighed to obtain compositions shown in Tables 5 and 6, which were then mixed using zirconia balls for 10 hours and were subjected to the solid-state reaction at 1350° C. for 10 hours. Using zirconia balls, the powders were pulverized for another 10 to 15 hours, and were then molded into cylinders having an outer diameter of 16 mm, an inner diameter of 12 mm and a length of 100 mm and were fired at 1460° to 1550° C. to obtain tubular sintered products. The grain size of the sintered products was 7 to 12 um. The obtained sintered products were measured for their open porosity by the Archmedes' method and the average pore size was measured by the mercury intrusion porosity method. The results were as shown in Tables 5 and 6.

The tubular sintered product was divided into two having a length of 50 mm, and was examined for its breaking strength using a diameter ring compression strength test apparatus. Further, the sample having a length of 30 mm was cut out from the tubular sintered product, and the coefficient of gas permeation from the tubular sintered product was measured by the permeation coefficient measuring apparatus using a nitrogen gas of a temperature of 25° C. The results of measurement were as shown in Tables 5 and 6.

According to Tables 5 and 6, when the open porosity is smaller than 15%, the gas-permeation coefficient becomes smaller than 0.04 (ml. $cm^2$/g.min. (cmHg)) though the breaking strength is high, whereby the diffusion rate of

TABLE 5

| Sample No. | $(La_{1-x-y}A_xB_y)_z(Mn_{1-u}C_u)O_\delta$ | | | | | Open porosity (%) | Average pore size (μm) | Permeation coefficient note 1) | Breaking strength (kg/mm²) |
|---|---|---|---|---|---|---|---|---|---|
| | Ax | | By | | z | | | | |
| 3-1 | Y | 0.10 | Ca | 0.30 | 1.0 | 14 | 1.2 | 0.02 | 5.2 |
| 3-2 | Y | 0.10 | Ca | 0.30 | 1.0 | 16 | 1.3 | 0.044 | 5.0 |
| 3-3 | Y | 0.10 | Ca | 0.30 | 1.0 | 20 | 1.3 | 0.055 | 4.7 |
| 3-4 | Y | 0.10 | Ca | 0.30 | 1.0 | 26 | 1.4 | 0.066 | 4.4 |
| 3-5 | Y | 0.10 | Ca | 0.30 | 1.0 | 31 | 0.8 | 0.037 | 4.9 |
| 3-6 | Y | 0.10 | Ca | 0.30 | 1.0 | 30 | 1.2 | 0.051 | 4.7 |
| 3-7 | Y | 0.10 | Ca | 0.30 | 1.0 | 31 | 2.1 | 0.074 | 4.5 |
| 3-8 | Y | 0.10 | Ca | 0.30 | 1.0 | 31 | 2.9 | 0.075 | 4.2 |
| 3-9 | Y | 0.10 | Ca | 0.30 | 1.0 | 32 | 4.8 | 0.085 | 3.8 |
| 3-10 | Y | 0.10 | Ca | 0.30 | 1.0 | 30 | 5.5 | 0.089 | 3.6 |
| 3-11 | Y | 0.10 | Ca | 0.30 | 1.0 | 32 | 6.2 | 0.091 | 2.9 |
| 3-12 | Y | 0.10 | Ca | 0.30 | 1.0 | 35 | 2.0 | 0.072 | 4.5 |
| 3-13 | Y | 0.10 | Ca | 0.30 | 1.0 | 38 | 2.1 | 0.076 | 4.4 |
| 3-14 | Y | 0.10 | Ca | 0.30 | 1.0 | 39 | 4.3 | 0.082 | 3.5 |
| 3-15 | Y | 0.10 | Ca | 0.30 | 1.0 | 38 | 6.1 | 0.093 | 2.4 |
| 3-16 | Y | 0.10 | Ca | 0.30 | 1.0 | 40 | 2.3 | 0.082 | 4.0 |
| 3-17 | Y | 0.10 | Ca | 0.30 | 1.0 | 42 | 2.1 | 0.090 | 3.5 |
| 3-18 | Y | 0.10 | Ca | 0.30 | 1.0 | 46 | 2.1 | 0.093 | 2.8 |
| 3-19 | Y | 0.10 | Ca | 0.30 | 1.0 | 47 | 2.5 | 0.095 | 2.3 |
| 3-20 | Yb | 0.10 | Sr | 0.40 | 1.0 | 21 | 1.4 | 0.042 | 5.6 |
| 3-21 | Yb | 0.10 | Sr | 0.40 | 1.0 | 30 | 0.7 | 0.031 | 5.4 |
| 3-22 | Yb | 0.10 | Sr | 0.40 | 1.0 | 31 | 1.2 | 0.052 | 5.1 |
| 3-23 | Yb | 0.10 | Sr | 0.40 | 1.0 | 29 | 1.6 | 0.063 | 5.0 |
| 3-24 | Yb | 0.10 | Sr | 0.40 | 1.0 | 32 | 2.7 | 0.065 | 4.7 |
| 3-25 | Yb | 0.10 | Sr | 0.40 | 1.0 | 31 | 3.1 | 0.071 | 3.9 |
| 3-26 | Yb | 0.10 | Sr | 0.40 | 1.0 | 30 | 4.7 | 0.075 | 3.3 |
| 3-27 | Yb | 0.10 | Sr | 0.40 | 1.0 | 32 | 5.4 | 0.082 | 2.5 |
| 3-28 | Yb | 0.10 | Sr | 0.40 | 1.0 | 34 | 2.4 | 0.073 | 4.5 |
| 3-29 | Yb | 0.10 | Sr | 0.40 | 1.0 | 39 | 1.9 | 0.078 | 4.1 |
| 3-30 | Yb | 0.10 | Sr | 0.40 | 1.0 | 48 | 2.2 | 0.089 | 2.6 |
| 3-31 | Yb | 0.10 | Ca | 0.30 | 1.0 | 34 | 1.7 | 0.070 | 4.3 |
| 3-32 | Sc | 0.10 | Sr | 0.30 | 1.0 | 36 | 1.9 | 0.071 | 4.2 |
| 3-33 | Er | 0.10 | Sr | 0.30 | 1.0 | 30 | 1.9 | 0.070 | 4.6 |
| 3-34 | Y | 0.10 | Sr | 0.40 | 1.0 | 35 | 2.1 | 0.074 | 4.8 |
| 3-35 | Yb | 0.10 | Ba | 0.35 | 1.0 | 35 | 2.2 | 0.074 | 4.2 |
| 3-36 | Sc | 0.10 | Ba | 0.35 | 1.0 | 36 | 2.0 | 0.077 | 4.0 |
| 3-37 | Y | 0.10 | Ca | 0.30 | 0.95 | 35 | 1.9 | 0.071 | 4.5 |
| 3-38 | Sc | 0.10 | Sr | 0.30 | 0.90 | 38 | 2.2 | 0.078 | 4.2 |

Unit of permeation coefficient is (ml · $cm^2$/g · min · (cmHg))

TABLE 6

| Sample No. | $(La_{1-x-y}A_xB_y)_z(Mn_{1-u}C_u)O_\delta$ | | | | | | | Open porosity (%) | Average pore size (μm) | Permeation coefficient note 1) | Breaking strength (kg/mm²) |
|---|---|---|---|---|---|---|---|---|---|---|---|
| | Ax | | By | | z | Cu | | | | | |
| 3-39 | Y | 0.10 | Ca | 0.30 | 1.0 | Co | 0.10 | 23 | 1.9 | 0.047 | 5.1 |
| 3-40 | Y | 0.20 | Ca | 0.20 | 1.0 | Co | 0.40 | 35 | 2.0 | 0.072 | 4.4 |
| 3-41 | Y | 0.10 | Ca | 0.30 | 1.0 | Ni | 0.10 | 35 | 2.2 | 0.073 | 4.3 |
| 3-42 | Y | 0.10 | Ca | 0.30 | 1.0 | Ni | 0.50 | 47 | 1.8 | 0.091 | 2.8 |
| 3-43 | Y | 0.10 | Ca | 0.30 | 1.0 | Zr | 0.20 | 40 | 1.8 | 0.083 | 4.1 |
| 3-44 | Y | 0.10 | Ca | 0.30 | 1.0 | Ce | 0.20 | 37 | 2.0 | 0.074 | 4.8 |
| 3-45 | Y | 0.10 | Ca | 0.30 | 1.0 | Fe | 0.20 | 28 | 2.1 | 0.061 | 4.7 |
| 3-46 | Y | 0.10 | Ba | 0.30 | 1.0 | Co | 0.10 | 35 | 2.3 | 0.071 | 4.2 |
| 3-47 | Yb | 0.10 | Ca | 0.30 | 1.0 | Ni | 0.10 | 36 | 1.9 | 0.074 | 4.3 |
| 3-48 | Yb | 0.10 | Ba | 0.30 | 1.0 | Co | 0.10 | 29 | 2.0 | 0.064 | 4.5 |
| 3-49 | Yb | 0.10 | Ba | 0.30 | 1.0 | Fe | 0.10 | 41 | 2.1 | 0.084 | 3.9 |
| 3-50 | Yb | 0.10 | Ba | 0.30 | 1.0 | Zr | 0.10 | 20 | 2.0 | 0.041 | 5.4 |
| 3-51 | Er | 0.10 | Ca | 0.30 | 1.0 | Ni | 0.10 | 44 | 1.9 | 0.089 | 3.3 |
| 3-52 | Er | 0.10 | Ca | 0.30 | 1.0 | Ce | 0.20 | 34 | 1.7 | 0.072 | 4.3 |
| 3-53 | Er | 0.10 | Ca | 0.30 | 1.0 | Zr | 0.20 | 36 | 1.9 | 0.075 | 4.3 |
| 3-54 | Er | 0.10 | Ca | 0.30 | 1.0 | Zr | 0.20 | 36 | 3.5 | 0.084 | 3.8 |
| 3-55 | Er | 0.10 | Ca | 0.30 | 1.0 | Zr | 0.20 | 37 | 3.5 | 0.097 | 2.7 |

Note) Unit of permeation coefficient is (ml · $cm^2$/g · min · (cmHg))

oxygen becomes small in the pores of the tube to adversely affect the generation of power. As the open porosity exceeds 45%, on the other hand, the strength becomes smaller than 3 kg/mm² though an excellent gas-permeation coefficient is obtained, and handling becomes very difficult. From the above results, it is judged that the open porosity of the air electrode according to the present invention ranges preferably from 15 to 45%. Because of the same reason, it is also judged that the average pore size preferably ranges from 1.0 to 5.0 μm.

Example 4

By using the starting materials of compositions Nos. 1, 5, 20, 34, 41 and 46 in the Tables of Example 2, cylinders with their ends on one side being closed were molded and were so fired at a temperature of 1460° C. to 1500° C. as will have an outer diameter of 15 mm, an inner diameter of 11 mm and a length of 200 mm, in order to obtain a tubular sintered products having an average pore size of 1.55 to 1.98 μm, an average grain size of 7 to 9 μm and an open porosity of 37 to 40%.

Then, with the tubular sintered product as an air electrode, a solid oxide of a composition of 10 mol% $Y_2O_3$/90 mol% $ZrO_2$ was applied to the surface thereof maintaining a thickness of 130 to 150 μm by the spraying method and, then, a fuel electrode of a composition of 80% by weight of Ni/20% by weight of $ZrO_2$ (containing 8 mol% $Y_2O_3$) was applied so that the thickness becomes 50 μ by the slurry-dip method, in order to fabricate a single tubular cell.

While flowing an oxygen gas inwardly of the tubular single cell and a hydrogen gas outwardly of the cell, continuous generation of power was carried out at 1000° to 1020° C. for 300 hours. Table 7 shows the output density of a single cell before and after 300 hours and 3000 hours. This table show that samples outside the present invention, namely Nos. 1 and 20, had a low output density after operation for 3000 hours, and the samples of the present invention, namely Nos. 3, 34, 41, and 46, shows hardly any change in output density even after 3000 hours operation. A large deformation was recognized in cells Nos. 1 and 20 after testing. These results show that the air electrode materials of this invention have excellent performance.

Example 5

Starting materials of the commercially available powders of $Y_2O_3$, $La_2O_3$, $Yb_2O_3$, $Sc_2O_3$, $Er_2O_3$, $Nd_2O_3$, $Gd_2O_3$, $Dy_2O_3$, $Sm_2O_3$, $CaCO_3$, $SrCO_3$, $BaCO_3$, $Mn_2O_3$, MgO, ZnO, $Al_2O_3$, and $Sb_2O_3$ having a purity of 99.9% were mixed to obtain compositions shown in Tables 8 to 10, which were mixed using zirconia balls for 10 hours, and were subjected to the solid-state reaction at 1350° C. for 10 hours. The powders were further pulverized for another 10 to 15 hours using zirconia balls, and were then molded into cylinders having an outer diameter of 15 mm, an inner diameter of 11 mm and a length of 200 mm, followed by firing at 1450° to 1500° C. In particular, the samples without containing MgO, $Al_2O_3$, $Cr_2O_3$, FeO, CoO or NiO were fired at 1500° to 1560° C. Thus, there were obtained tubular sintered products having open porosities of 38 to 41% and average grain sizes of 7 to 10 μm.

The thus obtained sintered products were measured for their average pore size by the mercury intrusion porosity method. Thereafter, the shrinkage was measured in the same manner as in Example 2.

Samples having a side of 1.5 mm and a length of 10 mm were cut out from the above sintered products and their coefficients of thermal expansion were measured over a temperature range of from room temperature to 1000° C. For the purpose of comparison, a commercially available YSZ ($ZrO_2$ containing 8 mol% of $Y_2O_3$) sintered product having a theoretical density ratio of 98.2% was used as a solid oxide. The results of measurement were as shown in Tables 8, 9 and 10.

TABLE 7

| Air electrode material composition | Output density (W/cm²) | |
|---|---|---|
| (samples Nos.) | after 300 hours | after 3000 hours |
| *No. 1 | 0.17 | 0.06 |
| No. 5 | 0.24 | 0.22 |
| *No. 20 | 0.20 | 0.09 |
| No. 34 | 0.25 | 0.23 |
| No. 41 | 0.26 | 0.24 |
| No. 46 | 0.23 | 0.20 |

*indicates materials outside the range of this invention.

TABLE 8

| Sample | $(La_{1-x-y}A_xB_y)_z(Mn_{1-u}C_u)O_\delta$ | | | | | Shrinkage | Coefficient of thermal expansion | Average pore size |
|---|---|---|---|---|---|---|---|---|
| No. | Ax | | By | | Cu | z | (%) | ×10⁻⁶/°C. | (μm) |
| 5-*1 | YSZ | | | | | | — | 10.0 | — |
| 5-*2 | — | | Ca | 0.20 | — | 1.0 | 1.88 | 10.7 | 1.97 |
| 5-*3 | Y | 0.05 | Ca | 0.20 | Mg 0.05 | 1.0 | 1.63 | 10.5 | 1.89 |

TABLE 8-continued

| Sample No. | $(La_{1-x-y}A_xB_y)_z(Mn_{1-u}C_u)O_\delta$ | | | | | | | Shrinkage (%) | Coefficient of thermal expansion $\times 10^{-6}/°C$ | Average pore size (μm) |
|---|---|---|---|---|---|---|---|---|---|---|
| | Ax | | By | | Cu | | z | | | |
| 5-*4 | Y | 0.01 | Ca | 0.25 | Mg | 0.05 | 1.0 | 0.35 | 11.3 | 1.79 |
| 5-5 | Y | 0.02 | Ca | 0.25 | Mg | 0.05 | 1.0 | 0.33 | 11.0 | 1.91 |
| 5-6 | Y | 0.05 | Ca | 0.25 | Mg | 0.05 | 1.0 | 0.28 | 10.9 | 1.91 |
| 5-7 | Y | 0.05 | Ca | 0.30 | Mg | 0.05 | 1.0 | 0.33 | 10.5 | 2.11 |
| 5-8 | Y | 0.10 | Ca | 0.30 | Mg | 0.05 | 1.0 | 0.28 | 10.2 | 1.73 |
| 5-9 | Y | 0.10 | Ca | 0.30 | Mg | 0.05 | 1.05 | 0.26 | 10.2 | 1.98 |
| 5-10 | Y | 0.10 | Ca | 0.30 | Mg | 0.05 | 0.95 | 0.28 | 10.1 | 1.98 |
| 5-11 | Y | 0.10 | Ca | 0.30 | Mg | 0.05 | 0.90 | 0.45 | 10.3 | 1.97 |
| 5-*12 | Y | 0.10 | Ca | 0.30 | Mg | 0.05 | 0.85 | 2.13 | 10.3 | 1.87 |
| 5-13 | Y | 0.15 | Ca | 0.30 | Mg | 0.05 | 1.0 | 0.35 | 10.0 | 1.87 |
| 5-14 | Y | 0.20 | Ca | 0.30 | Mg | 0.05 | 1.0 | 0.34 | 9.8 | 1.99 |
| 5-15 | Y | 0.35 | Ca | 0.30 | Mg | 0.05 | 1.0 | 0.35 | 8.9 | 2.03 |
| 5-16 | Y | 0.15 | Ca | 0.35 | Mg | 0.05 | 1.0 | 0.32 | 10.0 | 1.98 |
| 5-17 | Y | 0.15 | Ca | 0.35 | Mg | 0.05 | 1.0 | 0.35 | 10.0 | 2.02 |
| 5-18 | Y | 0.05 | Ca | 0.35 | Mg | 0.05 | 1.0 | 0.33 | 10.5 | 2.05 |
| 5-19 | Y | 0.20 | Ca | 0.35 | Mg | 0.05 | 1.0 | 0.34 | 9.7 | 2.10 |
| 5-20 | Y | 0.15 | Ca | 0.35 | Mg | 0.05 | 0.95 | 0.25 | 9.7 | 2.09 |
| 5-21 | Y | 0.15 | Ca | 0.35 | Mg | 0.10 | 1.0 | 0.40 | 10.4 | 2.10 |
| 5-22 | Y | 0.15 | Ca | 0.35 | Mg | 0.25 | 1.0 | 0.50 | 11.1 | 1.87 |
| 5-*23 | Y | 0.15 | Ca | 0.35 | Mg | 0.35 | 1.0 | 1.35 | 11.3 | 1.87 |
| 5-24 | Y | 0.10 | Ca | 0.40 | Mg | 0.05 | 1.0 | 0.24 | 10.4 | 1.97 |
| 5-25 | Y | 0.20 | Ca | 0.40 | Mg | 0.05 | 1.0 | 0.26 | 10.0 | 1.83 |
| 5-26 | Y | 0.25 | Ca | 0.40 | Mg | 0.05 | 1.0 | 0.21 | 9.4 | 1.76 |
| 5-27 | Y | 0.30 | Ca | 0.50 | Mg | 0.05 | 1.0 | 0.45 | 9.4 | 1.85 |
| 5-28 | Y | 0.40 | Ca | 0.50 | Mg | 0.05 | 1.0 | 0.51 | 8.9 | 1.96 |
| 5-29 | Yb0.1Y0.1 | | Ca | 0.40 | Mg | 0.05 | 1.0 | 0.33 | 10.2 | 1.97 |
| 5-30 | Sc0.1Y0.1 | | Ca | 0.40 | Mg | 0.05 | 1.0 | 0.37 | 10.0 | 1.88 |
| 5-31 | Dy0.1Y0.1 | | Sr | 0.1 | Mg | 0.05 | 1.0 | 0.35 | 10.1 | 1.88 |
| | | | Ca | 0.1 | | | | | | |

Samples marked with * lie outside the scope of the invention.

TABLE 9

| Sample No. | $(La_{1-x-y}A_xB_y)_z(Mn_{1-u}C_u)O_\delta$ | | | | | | | Shrinkage (%) | Coefficient of thermal expansion $\times 10^{-6}/°C$ | Average pore size (μm) |
|---|---|---|---|---|---|---|---|---|---|---|
| | Ax | | By | | Cu | | z | | | |
| 5-32 | Y | 0.15 | Ca | 0.35 | Al | 0.05 | 1.0 | 0.35 | 10.1 | 1.96 |
| 5-33 | Yb | 0.02 | Sr | 0.25 | Mg | 0.02 | 1.0 | 0.28 | 10.9 | 1.92 |
| 5-34 | Yb | 0.10 | Sr | 0.30 | Mg | 0.02 | 0.95 | 0.38 | 10.5 | 1.97 |
| 5-*35 | Yb | 0.10 | Sr | 0.30 | Mg | 0.02 | 0.85 | 2.24 | 10.3 | 1.79 |
| 5-36 | Yb | 0.10 | Sr | 0.35 | Mg | 0.02 | 1.0 | 0.27 | 10.5 | 1.78 |
| 5-37 | Yb | 0.10 | Sr | 0.35 | Mg | 0.02 | 1.0 | 0.26 | 10.3 | 1.97 |
| 5-38 | Yb | 0.15 | Sr | 0.35 | Mg | 0.02 | 1.0 | 0.28 | 9.9 | 1.97 |
| 5-39 | Yb | 0.15 | Sr | 0.35 | Mg | 0.10 | 1.0 | 0.31 | 10.3 | 1.39 |
| 5-40 | Yb | 0.15 | Sr | 0.35 | Mg | 0.15 | 1.0 | 0.42 | 10.7 | 2.01 |
| 5-*41 | Yb | 0.15 | Sr | 0.35 | Mg | 0.35 | 1.0 | 1.33 | 11.3 | 2.15 |
| 5-42 | Sc | 0.10 | Sr | 0.35 | Mg | 0.02 | 1.0 | 0.32 | 10.2 | 2.09 |
| 5-43 | Sc | 0.10 | Sr | 0.45 | Mg | 0.02 | 1.0 | 0.46 | 10.9 | 1.92 |
| 5-44 | Sc | 0.40 | Sr | 0.50 | Mg | 0.02 | 1.0 | 0.44 | 8.8 | 1.98 |
| 5-45 | Er | 0.10 | Sr | 0.35 | Mg | 0.02 | 1.0 | 0.28 | 10.3 | 2.11 |
| 5-46 | Nd | 0.10 | Sr | 0.35 | Mg | 0.02 | 1.0 | 0.35 | 10.5 | 1.87 |
| 5-47 | Gd | 0.10 | Sr | 0.35 | Mg | 0.02 | 1.0 | 0.30 | 10.3 | 1.88 |
| 5-48 | Dy | 0.10 | Sr | 0.35 | Mg | 0.02 | 1.0 | 0.30 | 10.2 | 1.90 |
| 5-49 | Er | 0.15 | Ca | 0.35 | Mg | 0.02 | 1.0 | 0.33 | 10.1 | 1.85 |
| 5-50 | Er | 0.25 | Ca | 0.25 | Mg | 0.02 | 1.0 | 0.44 | 9.8 | 2.00 |
| 5-51 | Er | 0.25 | Ca | 0.35 | Mg | 0.02 | 1.0 | 0.42 | 8.9 | 2.07 |
| 5-52 | Yb | 0.15 | Ca | 0.35 | Mg | 0.02 | 1.0 | 0.29 | 9.8 | 1.86 |
| 5-53 | Sc | 0.15 | Ca | 0.35 | Mg | 0.02 | 1.0 | 0.31 | 9.7 | 1.98 |
| 5-54 | Nd | 0.10 | Ca | 0.35 | Mg | 0.02 | 1.0 | 0.32 | 10.1 | 1.93 |
| 5-55 | Gd | 0.15 | Ca | 0.35 | Mg | 0.02 | 1.0 | 0.32 | 9.8 | 1.97 |
| 5-56 | Dy | 0.15 | Ca | 0.35 | Mg | 0.02 | 1.0 | 0.33 | 9.7 | 2.04 |
| 5-57 | Y | 0.10 | Ba | 0.30 | Mg | 0.02 | 1.0 | 0.26 | 10.4 | 2.08 |
| 5-58 | Yb | 0.10 | Ba | 0.30 | Mg | 0.02 | 1.0 | 0.27 | 10.3 | 2.09 |
| 5-59 | Sc | 0.10 | Ba | 0.30 | Mg | 0.02 | 1.0 | 0.36 | 10.3 | 2.01 |
| 5-60 | Er | 0.10 | Ba | 0.30 | Mg | 0.02 | 1.0 | 0.35 | 10.4 | 1.88 |

TABLE 9-continued

| Sample No. | (La$_{1-x-y}$A$_x$B$_y$)$_z$(Mn$_{1-u}$C$_u$)O$_\delta$ | | | | | | | Shrinkage (%) | Coefficient of thermal expansion ×10$^{-6}$/°C. | Average pore size (μm) |
|---|---|---|---|---|---|---|---|---|---|---|
| | Ax | | By | | Cu | | z | | | |
| 5-61 | Nd | 0.10 | Ba | 0.30 | Mg | 0.02 | 1.0 | 0.34 | 10.2 | 1.89 |
| 5-62 | Gd | 0.10 | Ba | 0.30 | Mg | 0.02 | 1.0 | 0.30 | 10.4 | 1.79 |
| 5-*63 | Dy | 0.10 | Ba | 0.20 | Mg | 0.02 | 1.0 | 1.34 | 10.5 | 2.00 |
| 5-64 | Dy | 0.25 | Ba | 0.30 | Mg | 0.02 | 1.0 | 0.34 | 9.3 | 1.93 |
| 5-65 | Dy | 0.40 | Ba | 0.30 | Mg | 0.02 | 1.0 | 0.34 | 8.8 | 1.99 |
| 5-66 | Sm | 0.10 | Ba | 0.30 | Mg | 0.05 | 1.0 | 0.34 | 10.3 | 1.95 |
| 5-67 | Y | 0.10 | Ca | 0.30 | Sb | 0.05 | 1.0 | 0.30 | 10.1 | 1.97 |

Samples marked with * lie outside the scope of the invention.

TABLE 10

| Sample No. | (La$_{1-x-y}$A$_x$B$_y$)$_z$(Mn$_{1-u}$C$_u$)O$_\delta$ | | | | | | | Shrinkage (%) | Coefficient of thermal expansion ×10$^{-6}$/°C. | Average pore size (μm) |
|---|---|---|---|---|---|---|---|---|---|---|
| | Ax | | By | | Cu | | z | | | |
| 5-68 | Yb | 0.15 | Sr | 0.35 | Cr | 0.02 | 1.0 | 0.36 | 10.0 | 1.98 |
| 5-69 | Yb | 0.15 | Sr | 0.35 | Al | 0.02 | 1.0 | 0.30 | 10.1 | 1.89 |
| 5-*70 | Yb | 0.15 | Sr | 0.35 | Al | 0.35 | 1.0 | 1.27 | 11.2 | 1.98 |
| 5-71 | Sr | 0.15 | Sr | 0.35 | Cr | 0.03 | 1.0 | 0.29 | 10.2 | 1.99 |
| 5-72 | Nd | 0.15 | Sr | 0.35 | Ni | 0.03 | 1.0 | 0.28 | 10.3 | 1.89 |
| 5-73 | Cd | 0.15 | Sr | 0.35 | Co | 0.03 | 1.0 | 0.34 | 10.1 | 2.00 |
| 5-74 | Yb | 0.15 | Sr | 0.35 | Al | 0.03 | 1.0 | 0.35 | 10.2 | 2.09 |
| 5-75 | Yb | 0.15 | Sr | 0.35 | Al | 0.03 | 0.95 | 0.32 | 10.3 | 2.08 |
| 5-*76 | Er | 0.15 | Ba | 0.20 | Cr | 0.02 | 1.0 | 2.35 | 9.5 | 2.03 |
| 5-77 | Er | 0.15 | Ba | 0.35 | Cr | 0.02 | 1.0 | 0.36 | 10.2 | 2.08 |
| 5-78 | Er | 0.15 | Ba | 0.35 | Zn | 0.02 | 1.0 | 0.35 | 10.5 | 2.04 |

Samples marked with * lie outside the scope of the invention.

As will be obvious from the results of Tables 8 to 10, the shrinkage increases when the substitution ratio (y-value) of divalent metals is smaller than 0.25. When the y-value exceeds 0.5, on the other hand, the sintering property becomes poor and it is not allowed to obtain a support tube having a predetermined open porosity. When the substitution ratio (x-value) of trivalent metals is smaller than 0.02 or is greater than 0.4, the difference in the coefficient of thermal expansion from that of the solid oxide becomes greater than 10%. When the substitution ratio (u-value) of Mg and Al exceeds 0.3, the difference in the coefficient of thermal expansion similarly becomes greater than 10%. As for the nonstoicheometry, when the atomic ratio of the A-site becomes smaller than 0.9, a compound containing Mn is precipitated and shrinking is promoted. When this ratio exceeds 1.05, on the other hand, La$_2$O$_3$ is precipitated and the material is weathered within short periods of time.

Example 6

The samples Nos. 8 and 37 in Tables 8 and 9 of Example 5 were calcined at temperatures changing over a range of from 1200° to 1500° C. to prepare calcined powders of different grain sizes which were then molded into cylinders followed by firing at a temperature of 1400° to 1560° C. for 5 to 12 hours to obtain tubular sintered products having an outer diameter of 14 mm, an inner diameter of 10 mm, a length of 100 mm, an open porosity of 36 to 39%, and an average pore size of 0.86 to 6.33 μm. A tubular sample having a length of 40 mm was cut out therefrom and was measured for its breaking strength using the diametal ring compression strength test apparatus. Moreover, a sample having a length of 30 mm was cut out from the tubular sintered material and was measured for its gas-permeation coefficient using a nitrogen gas at room temperature (22° to 24° C.). The results were as shown Table 11.

TABLE 11

| Sample No. | Average pore size (μm) | Gas-permeation coefficient (**) | Breaking strength (kg/mm$^2$) |
|---|---|---|---|
| 8 | 0.92 | 0.035 | 6.3 |
| | 1.14 | 0.051 | 6.0 |
| | 1.45 | 0.062 | 5.4 |
| | 1.68 | 0.072 | 4.3 |
| | 2.21 | 0.084 | 4.1 |
| | 2.44 | 0.087 | 4.0 |
| | 3.04 | 0.087 | 3.7 |
| | 3.67 | 0.090 | 3.5 |
| | 4.88 | 0.093 | 3.0 |
| | 5.34 | 0.095 | 2.5 |
| | 6.33 | 0.098 | 2.1 |
| 37 | 0.86 | 0.032 | 6.2 |
| | 1.45 | 0.060 | 5.3 |
| | 2.24 | 0.082 | 4.2 |
| | 2.88 | 0.090 | 4.0 |
| | 3.71 | 0.089 | 3.5 |
| | 4.23 | 0.090 | 3.3 |
| | 4.78 | 0.092 | 3.1 |
| | 5.76 | 0.095 | 2.2 |

Unit is in ml · cm$^2$/g · min · (cmHg)

According to Table 11, the gas-permeation coefficient increases with an increase in the average pore size, but resulting in a decrease in the strength. When the average pore size is smaller than 1.0 μm, the breaking strength is sufficient but the gas-permeation coefficient is small. From these results, it is considered that the average pore size should practically be from 1.0 to 5.0 μm.

Example 7

Using the samples Nos. 2, 8, 9, 25, 33 and 61 of Tables 8 and 9 of Example 5, hollow tubular sintered products were prepared having an average pore size of 1.89 to 1.99 μm, an outer diameter of 16 mm, an inner diameter of 12 mm, and a length of 200 mm with their ends on one side being closed, and were used as support tubes that also functioned as air electrodes.

Furthermore, porous $ZrO_2$ tubular sintered products having an outer diameter of 13 mm, an inner diameter of 10 mm, a length of 200 mm and containing 15 mol% of CaO or 10 mol% of $Y_2O_3$ (the former product is referred to as 15CSZ and the latter product is referred to as 10 YSZ) were coated with powders of compositions of Nos. 2, 9 and 63 maintaining a thickness of about 1.5 mm by the slurry-dip method and were fired in the open air at 1400° C. for 3 hours, such that the powders were baked to the tubular sintered products and that the powders themselves were sintered, thereby to prepare air electrodes.

The 15CSZ and 10YSZ possessed average pore sizes of 2.32 μm and 2.51 μm, respectively. Furthermore, the sintered air electrodes possessed the average pore size of 1.92 μm on the side of 15 CSZ and 2.11 μm on the side of 10YSZ.

Thereafter, the outer peripheral surfaces of the above tubular product was coated with a solid oxide film ($ZrO_2$ containing 10 mol% of $Y_2O_3$) maintaining a thickness of about 50 μm at 1100° C. by the gas-phase synthesizing method, which was further coated with $ZrO_2$ containing 70% by weight of Ni ($ZrO_2$ contains 8 mol% of $Y_2O_3$) maintaining a thickness of about 40 μm as the fuel electrode by the slurry-dip method, in order to prepare a single cell.

While flowing an oxygen gas inwardly of the tubular single cell and a hydrogen gas outwardly of the cell, continuous power generation was carried out at 1000° to 1020° C. for 3000 hours. Table 12 shows the output densities of a single cell after 300 hours and after 3000 hours. This table shows that the sample outside the present invention, namely No. 2 had decreased output density after 3000 hours. When the air electrode of No. 2 is used as a direct supporting tube, the air electrode is deformed after operation for about 2400 hours, and as a result, the cell is destroyed. On the other hand, the materials of this invention, Nos. 8, 9, 25, 33, and 61 hardly changed in output density after operation for 3000 hours. Since the air electrode materials of the invention have excellent dimensional stability, they have very small deformation. Furthermore, since they have good contactability with the solid electrolyte, they have high output density. It is clear therefore that the materials of this invention have fully excellent performances.

TABLE 12

| Sample No. | Average pore diameter (μm) | Type of the supporting tube | Output density (W/cm²) | |
|---|---|---|---|---|
| | | | After 300 hours | After 3000 hours |
| *2 | 1.92 | none | 0.19 | destroyed |
| *2 | 1.92 | 15 CSZ | 0.17 | 0.04 |
| 8 | 1.93 | none | 0.24 | 0.20 |
| 9 | 1.92 | 15 CSZ | 0.26 | 0.25 |
| 25 | 1.95 | none | 0.24 | 0.22 |
| 33 | 2.08 | none | 0.25 | 0.23 |
| 61 | 2.11 | 10 YSZ | 0.26 | 0.23 |

**Shows materials outside the range of the present invention.

Example 8

Starting materials of the commercially available Powders of $La_2O_3$, $Y_2O_3$, $CaCO_3$ and $MnO_2$ having a purity of 99.9% were mixed to obtain a composition shown in Tables 13 and 14, which was mixed using zirconia balls for 10 hours and was subjected to the solid-state reaction at 1300° C. for 10 hours. Furthermore, impurities such as of Al, Si, Fe, Co, Zr and Ti were suitably added to observe their effects upon the properties. The powders were further pulverized for another 24 hours using zirconia balls, and were then molded into cylinders followed by firing at 1480° to 1500° C. to obtain tubular sintered products having an outer diameter of 15 mm, an inner diameter of 10 mm, a length of 100 mm and an open porosity of 38 to 41%.

The kinds of metal impurities in the obtained sintered products were found by the fluorescent X-ray analysis and their amounts were quantitatively found by the ICP analysis. The results were as shown in Tables 13 and 14. As for the metal impurities other than Al and Si, those whose amounts exceed 300 ppm were listed in regard to their kinds and amounts in the column of remarks in Tables. Then, the shrinkage was measured in the same manner as in Example 2. Furthermore, samples having a size of 2 mm and a length of 10 mm were cut out from the above tubular sintered products and their coefficients of thermal expansion were measured over a temperature range of from room temperature to 1000° C. For the purpose of comparison, in this case, use was made of a commercially available $ZrO_2$ containing 10 mol% of $Y_2O_3$ and having a theoretical density ratio of 99.1%. The measured results were as shown in Tables 13 and 14.

The above-mentioned materials were annealed in the open air at 1000° C. for 200 hours and were then quickly quenched in the water. The materials were finely pulverized, dissolved in hydrochloric acid, and evolving chlorine was reacted with potassium iodide to liberate iodine. In the so-called iodine titrimetric method in which iodine is titrated with thiosulfuric acid, the amount of oxygen (δ) in the samples was determined by using the following neutralization formula (4)

$$\frac{(A-2) \times W}{M} = \frac{0.1 \times f \times L}{1000}$$

wherein,

A: average valency of Mn,

W: weight of the sample,

M: molecular weight, f: sodium thiosulfate factor,

L: amount of sodium thiosulfate needed for the titration, and the electrically neutralizing conditions of the formula (5)

$$B \times 3 + C \times 2 + A \times 1 = D \times 2$$

wherein,

A: average valency of Mn,

B: sum of ratio of La and ratio of trivalent metals substituted for La,

C: ratio of alkaline earth elements, and

D: amount (δ) of oxygen.

The measured results were as shown in Tables 13 and 14.

TABLE 13

| Sample No. | \multicolumn{4}{c}{$(La_{1-x-y}A_xB_y)_zMnO_\delta$} | | | | Amount of impurities (ppm) | | | Shrinkage (%) | Coefficient of thermal expansion $\times 10^{-6}$ | Amount of oxygen | Remarks (ppm) |
|---|---|---|---|---|---|---|---|---|---|---|---|---|---|
| | Ax | | By | | z | Al | Si | total amount | | | | | |
| Reference | $ZrO_2$ containing 10 mol % of $Y_2O_3$ | | | | | — | — | — | — | — | 10.0 | — | — |
| 8-*1 | — | | Ca | 0.20 | 1.0 | | | | 1.84 | 10.7 | — | — | |
| 8-*2 | Y | 0.05 | Ca | 0.10 | 1.0 | 90 | 90 | 730 | 1.02 | 9.6 | 3.122 | — | |
| 8-*3 | Y | 0.05 | Ca | 0.15 | 1.0 | 100 | 130 | 880 | 1.06 | 10.1 | 3.105 | — | |
| 8-*4 | Y | 0.05 | Ca | 0.20 | 1.0 | 70 | 140 | 930 | 1.61 | 10.5 | 3.068 | — | |
| 8-*5 | Y | 0.10 | Ca | 0.20 | 1.0 | 120 | 120 | 900 | 1.77 | 10.4 | 3.042 | — | |
| 8-6 | Y | 0.03 | Ca | 0.25 | 1.0 | 80 | 140 | 880 | 0.32 | 10.5 | 3.022 | — | |
| 8-7 | Y | 0.05 | Ca | 0.25 | 1.0 | 100 | 110 | 640 | 0.32 | 10.5 | 3.024 | — | |
| 8-8 | Y | 0.05 | Ca | 0.30 | 1.0 | 150 | 120 | 880 | 0.35 | 10.5 | 3.026 | — | |
| 8-9 | Y | 0.20 | Ca | 0.30 | 1.0 | 90 | 110 | 910 | 0.33 | 9.8 | 3.019 | — | |
| 8-10 | Y | 0.30 | Ca | 0.30 | 1.0 | 110 | 130 | 580 | 0.36 | 8.9 | 3.020 | — | |
| 8-*11 | Y | 0.10 | Ca | 0.30 | 0.85 | 120 | 120 | 810 | 2.03 | 10.5 | — | — | |
| 8-12 | Y | 0.10 | Ca | 0.30 | 0.90 | 100 | 130 | 560 | 0.44 | 10.3 | 2.958 | — | |
| 8-13 | Y | 0.10 | Ca | 0.30 | 0.95 | 110 | 110 | 720 | 0.25 | 10.1 | 2.967 | — | |
| 8-14 | Y | 0.10 | Ca | 0.30 | 1.05 | 110 | 120 | 570 | 0.41 | 10.2 | 3.015 | — | |
| 8-15 | Y | 0.10 | Ca | 0.30 | 1.0 | 230 | 240 | 780 | 0.51 | 10.2 | 3.014 | — | |
| 8-16 | Y | 0.10 | Ca | 0.30 | 1.0 | 170 | 130 | 880 | 0.24 | 10.2 | 3.015 | — | |
| 8-*17 | Y | 0.10 | Ca | 0.30 | 1.0 | 80 | 80 | 990 | 1.73 | 10.2 | 3.011 | Fe 560 | |
| 8-*18 | Y | 0.40 | Ca | 0.30 | 1.0 | 120 | 330 | 1210 | 1.65 | 10.2 | 3.016 | — | |
| 8-*19 | Y | 0.10 | Ca | 0.30 | 1.0 | 130 | 220 | 1320 | 1.98 | 10.2 | 3.012 | Ti 550 | |
| 8-20 | Y | 0.10 | Ca | 0.30 | 1.0 | 230 | 240 | 1540 | 0.60 | 10.2 | 3.011 | Co 330 | |
| 8-*21 | Y | 0.10 | Ca | 0.30 | 1.0 | 190 | 200 | 2230 | 1.75 | 10.2 | 3.017 | — | |

Samples marked with * lie outside the scope of the invention.

TABLE 14

| Sample No. | \multicolumn{4}{c}{$(La_{1-x-y}A_xB_y)_zMnO_\delta$} | | | | Amount of impurities (ppm) | | | Shrinkage (%) | Coefficient of thermal expansion $\times 10^{-6}$ | Amount of oxygen | Remarks (ppm) |
|---|---|---|---|---|---|---|---|---|---|---|---|---|---|
| | Ax | | By | | z | Al | Si | total amount | | | | | |
| 8-22 | Y | 0.15 | Ca | 0.30 | 1.0 | 120 | 180 | 780 | 0.30 | 10.0 | 3.014 | — | |
| 8-23 | Y | 0.15 | Ca | 0.30 | 1.0 | 120 | 110 | 880 | 0.47 | 10.0 | 3.016 | Co 350 | |
| 8-*24 | Y | 0.15 | Ca | 0.30 | 1.0 | 140 | 110 | 1160 | 2.02 | 10.0 | 3.017 | Co 630 | |
| 8-25 | Y | 0.15 | Ca | 0.30 | 1.0 | 220 | 170 | 1360 | 0.49 | 10.0 | 3.012 | Ti 350 | |
| 8-*26 | Y | 0.15 | Ca | 0.30 | 1.0 | 120 | 170 | 1460 | 2.47 | 10.1 | 3.015 | Zr 530 | |
| 8-*27 | Y | 0.15 | Ca | 0.30 | 1.0 | 430 | 210 | 1110 | 1.78 | 10.0 | 3.014 | — | |
| 8-28 | Y | 0.10 | Ca | 0.35 | 1.0 | 80 | 110 | 720 | 0.29 | 9.8 | 3.014 | — | |
| 8-29 | Y | 0.15 | Ca | 0.35 | 1.0 | 120 | 120 | 1560 | 0.58 | 9.7 | 3.012 | Fe 380 | |
| 8-*30 | Y | 0.15 | Ca | 0.35 | 1.0 | 140 | 170 | 2240 | 1.56 | 9.6 | 3.008 | — | |
| 8-31 | Y | 0.15 | Ca | 0.35 | 0.95 | 90 | 130 | 910 | 0.28 | 9.7 | 2.972 | — | |
| 8-32 | Y | 0.05 | Ca | 0.40 | 1.0 | 120 | 130 | 940 | 0.27 | 11.5 | 3.021 | — | |
| 8-33 | Y | 0.10 | Ca | 0.40 | 1.0 | 220 | 130 | 1580 | 0.65 | 10.8 | 3.018 | Fe 380 | |
| 8-34 | Y | 0.20 | Ca | 0.40 | 1.0 | 80 | 80 | 510 | 0.24 | 10.0 | 3.011 | — | |
| 8-35 | Y | 0.25 | Ca | 0.40 | 1.0 | 100 | 100 | 630 | 0.24 | 9.5 | 3.007 | — | |
| 8-36 | Y | 0.35 | Ca | 0.40 | 1.0 | 130 | 110 | 680 | 0.27 | 8.9 | 3.008 | — | |
| 8-37 | Y | 0.05 | Ca | 0.50 | 1.0 | 150 | 100 | 730 | 0.27 | 8.8 | 3.003 | — | |
| 8-*38 | Y | 0.10 | Ca | 0.50 | 1.0 | 210 | 120 | 2260 | 2.39 | 8.8 | 3.004 | Fe 300 | |
| 8-39 | Y | 0.20 | Ca | 0.50 | 1.0 | 100 | 80 | 630 | 0.56 | 9.11 | 3.002 | — | |
| 8-40 | Y | 0.30 | Ca | 0.50 | 1.0 | 100 | 110 | 800 | 0.60 | 10.1 | 3.000 | — | |
| 8-41 | Y | 0.40 | Ca | 0.50 | 1.0 | 140 | 80 | 930 | 0.56 | 10.3 | 3.000 | — | |
| 8-*42 | Y | 0.40 | Ca | 0.60 | 1.0 | 150 | 150 | 740 | — | — | 3.000 | — | |

Sample marked with * lie outside the scope of the invention.

According to the results of Tables 13 and 14, the shrinkage is great when the substitution ratio of Ca is smaller than 0.25. When the ratio exceeds 0.5, however, the sintering property is deteriorated and it is not allowed to obtain a tubular sintered product having a predetermined open porosity. Moreover, the difference in the coefficient of thermal expansion from the solid oxide becomes greater than 10% when the difference between the substitution ratio of Ca and the substitution ratio of Y is smaller than 0.1 or is greater than 0.30. As for the nonstoicheometry, furthermore, $Mn_3O_4$ is precipitated and the shrinking is promoted when the atomic ratio in the A-site becomes smaller than 0.9. When the atomic ratio exceeds 1.05, on the other hand, $La_2O_3$ is precipitated and the material is weathered within short periods of time. From the above results, the coefficient of thermal expansion is close to that of the solid oxide and the shrinkage is small when the substitution ratio of Ca is from 0.25 to 0.5, and the difference in the substitution ratio between Ca and Y is from 0.1 to 0.3. The shrinking increases when the amount of oxygen δ exceeds 3.04.

Example 9

Starting materials of the commercially available powders of $La_2O_3$, $Y_2O_3$, $Yb_2O_3$, $Sc_2O_3$, $Er_2O_3$, $Nd_2O_3$, $Gd_2O_3$, $Dy_2O_3$, $CaCO_3$, $SrCO_3$, $BaCO_3$ and $Mn_2O_3$ having a purity of 99.9% were mixed to obtain a composition shown in Tables 15 and 16. Then, impurities such as of Al, Si, Fe, Co, Zr, Ti and the like were added in trace amounts. The mixtures were then molded and fired by the same method as in Example 8 to obtain tubular sintered products having an open porosity of 38 to 42%.

The obtained sintered products were measured for their kinds and amounts of impurities, shrinkage and coefficients of thermal expansion by the same method as in Example 8. As for the impurities other than Al and Si, those whose amounts exceeds 300 ppm were listed in regard to their kinds and amounts in the column of remarks in Tables. The results were as shown in Tables 15 and 16.

TABLE 15

| Sample No. | $(La_{1-x-y}A_xB_y)_zMnO_\delta$ | | | | | Amount of impurities (ppm) | | | Shrinkage (%) | Coefficient of thermal expansion ×10⁻⁶ | Amount of oxygen | Remarks (ppm) |
|---|---|---|---|---|---|---|---|---|---|---|---|---|
| | Ax | | By | | z | Al | Si | total amount | | | | |
| 9-1 | Y | 0.10 | Sr | 0.35 | 1.0 | 140 | 130 | 870 | 0.22 | 10.5 | 3.017 | — |
| 9-2 | Y | 0.10 | Ba | 0.30 | 1.0 | 160 | 130 | 180 | 0.25 | 10.3 | 3.015 | — |
| 9-3 | Yb | 0.03 | Sr | 0.35 | 1.0 | 120 | 150 | 930 | 0.24 | 11.2 | 3.012 | — |
| 9-4 | Yb | 0.10 | Sr | 0.35 | 0.95 | 150 | 110 | 670 | 0.26 | 10.5 | 2.964 | — |
| 9-5 | Yb | 0.10 | Sr | 0.35 | 1.0 | 120 | 130 | 830 | 0.24 | 10.5 | 3.011 | — |
| 9-*6 | Yb | 0.10 | Sr | 0.35 | 1.0 | 350 | 110 | 950 | 1.85 | 10.5 | 3.008 | — |
| 9-*7 | Yb | 0.10 | Sr | 0.35 | 1.0 | 130 | 90 | 1720 | 2.21 | 10.4 | 3.014 | Fe  580 |
| 9-8 | Yb | 0.15 | Ca | 0.35 | 1.0 | 120 | 130 | 780 | 0.29 | 9.8 | 3.010 | — |
| 9-10 | Yb | 0.10 | Ba | 0.30 | 1.0 | 160 | 140 | 660 | 0.27 | 10.4 | 3.016 | — |
| 9-*11 | Er | 0.15 | Ca | 0.35 | 1.0 | 120 | 140 | 790 | 0.30 | 9.8 | 3.014 | — |
| 9-12 | Er | 0.15 | Ca | 0.35 | 1.0 | 120 | 140 | 1330 | 1.97 | 9.9 | 3.014 | Zr  650 |
| 9-13 | Er | 0.10 | Ba | 0.30 | 1.0 | 150 | 90 | 660 | 0.35 | 10.4 | 3.010 | — |
| 9-14 | Er | 0.10 | Sr | 0.35 | 4.0 | 80 | 90 | 530 | 0.27 | 10.3 | 3.011 | — |
| 9-15 | Nd | 0.10 | Sr | 0.35 | 1.0 | 130 | 140 | 850 | 0.31 | 10.5 | 3.015 | — |
| 9-16 | Nd | 0.15 | Ca | 0.35 | 1.0 | 130 | 120 | 760 | 0.28 | 9.7 | 3.010 | — |
| 9-17 | Nd | 0.10 | Ba | 0.35 | 1.0 | 170 | 140 | 790 | 0.32 | 10.3 | 3.012 | — |
| 9-18 | Gd | 0.10 | Sr | 0.35 | 1.0 | 140 | 150 | 740 | 0.33 | 10.5 | 3.017 | — |
| 9-19 | Gd | 0.15 | Ca | 0.35 | 1.0 | 120 | 140 | 770 | 0.32 | 9.8 | 3.016 | — |
| 9-20 | Gd | 0.10 | Ba | 0.30 | 1.0 | 190 | 150 | 870 | 0.30 | 10.4 | 3.012 | — |

Samples marked with * lie outside the scope of the invention.

TABLE 16

| Sample No. | $(La_{1-x-y}A_xB_y)_zMnO_\delta$ | | | | | Amount of impurities (ppm) | | | Shrinkage (%) | Coefficient of thermal expansion ×10⁻⁶ | Amount of oxygen | Remarks (ppm) |
|---|---|---|---|---|---|---|---|---|---|---|---|---|
| | Ax | | By | | z | Al | Si | total amount | | | | |
| 9-20 | Dy | 0.10 | Ba | 0.30 | 1.0 | 120 | 130 | 690 | 0.34 | 10.5 | 3.015 | — |
| 9-21 | Dy | 0.10 | Ba | 0.30 | 1.0 | 130 | 130 | 1740 | 2.34 | 10.4 | 3.017 | Co  630 |
| 9-22 | Dy | 0.10 | Ba | 0.30 | 1.0 | 260 | 290 | 2260 | 1.86 | 10.5 | 3.011 | — |
| 9-23 | Dy | 0.10 | Sr | 0.35 | 1.0 | 130 | 170 | 890 | 0.33 | 10.5 | 3.011 | — |
| 9-24 | Dy | 0.15 | Ca | 0.35 | 1.0 | 130 | 150 | 840 | 0.31 | 9.7 | 3.014 | — |
| 9-25 | Sc | 0.10 | Sr | 0.35 | 1.0 | 130 | 100 | 820 | 0.31 | 10.5 | 3.016 | — |
| 9-*26 | Sc | 0.10 | Sr | 0.35 | 1.0 | 160 | 330 | 820 | 2.47 | 10.4 | 3.017 | — |
| 9-27 | Sc | 0.10 | Sr | 0.50 | 1.0 | 130 | 150 | 920 | 0.46 | 11.1 | 3.004 | — |
| 9-28 | Sc | 0.30 | Sr | 0.50 | 1.0 | 130 | 150 | 920 | 0.46 | 9.7 | 3.003 | — |

TABLE 16-continued

| Sample No. | $(La_{1-x-y}A_xB_y)_zMnO_\delta$ | | | | | | Amount of impurities (ppm) | | | Shrinkage (%) | Coefficient of thermal expansion ×10⁻⁶ | Amount of oxygen | Remarks (ppm) | |
|---|---|---|---|---|---|---|---|---|---|---|---|---|---|---|
| | Ax | | By | | z | Al | Si | total amount | | | | | | |
| 9-29 | Sc | 0.10 | Ba | 0.30 | 1.0 | 170 | 110 | 790 | 0.33 | 10.3 | 3.015 | — | |
| 9-30 | Sc | 0.15 | Ca | 0.35 | 1.0 | 120 | 130 | 880 | 0.60 | 9.7 | 3.013 | Zr | 310 |
| 9-*31 | Sc | 0.15 | Ca | 0.35 | 1.0 | 120 | 140 | 990 | 1.66 | 9.6 | 3.013 | Ti | 530 |

Samples marked with * lie outside the scope of the invention.

From Tables 15 and 16, the effect of suppressing the shrinkage is similarly observed by any one of Y, Yb, Sc, Er, Nd, Gd and Dy. As for the impurity amounts, the shrinking increases when either Al or Si exceeds 300 ppm. The shrinking similarly increases when any one of Fe, Ti, Zr or Co exceeds 500 ppm or when the total amount of the impurities exceeds 2000 ppm.

From the above results, it is learned that the amount of metal impurities such as Al and Si should be smaller than 300 ppm, the amount of other metal impurities should be smaller than 500 ppm, and the total amount of the impurities should be smaller than 2000 ppm. The shrinking was small when the amount of oxygen δ was smaller than 3.03.

We claim:

1. An electrically conducting ceramic comprising a perovskite-type composite oxide of a composition represented by the following formula $$(La_{1-x-y}A_xB_y)_z(Mn_{1-u}C_u)_vO_\delta$$

wherein A represents at least one type of atom selected from the group consisting of Sc, Y, Nd, Yb, Er, Gd, Sm and Dy, B represents at least one type of atom selected from the group consisting of Ba, Sr and Ca, and C represents at least one type of atom selected from the group consisting of Co, Fe, Ni, Ce, Zr, Mg, Al, Sb and Cr and x, y, z, u, v and δ are the numbers that satisfy the following formulas:

$0.02 \leq x \leq 0.5$, $0.1 \leq y \leq 0.6$, $0.90 \leq z \leq 1.05$, $0 \leq u \leq 0.5$, $v=1.0$, and at a temperature of 1000° C. in the open air, $2.97 \leq \delta \leq 3.04$.

2. An electrically conducting ceramic according to claim 1, wherein in said formula, x, y, z, u, v and are the numbers that satisfy the following formulas:

$0.05 \leq x \leq 0.5$, $0.2 \leq y \leq 0.5$, $0.95 \leq z \leq 1.00$, $0 \leq u \leq 0.3$, $v=1.0$, and at a temperature of 1000° C. in the open air, $2.97 \leq \delta \leq 3.04$.

3. An electrically conducting ceramic according to claim 1, which comprises a composition represented by the following formula $$(La_{1-x-y}Y_xCa_y)_z(Mn)_vO_\delta$$

wherein x, y, z, v and δ are the numbers as described above.

4. An electrically conducting ceramic according to claim 1, which comprises a composition represented by the following formula $$(La_{1-x-y}Y_zCa_y)_z(Mn_{1-u}C_u)_vO_\delta$$

wherein C has the meaning as described above, and x, y, z, v and δ are the numbers as described above.

5. A solid oxide fuel cell in which an air electrode is provided on one surface of a solid electrolyte and a fuel electrode is provided on the other surface thereof, wherein said air electrode comprises a perovskite-type composite oxide of a composition represented by the following formula $$(La_{1-x-y}A_xB_y)_z(Mn_{1-u}C_u)_vO_\delta$$

wherein A represents at least one type of atom selected from the group consisting of Sc, Y, Nd, Yb, Er, Gd, Sm and Dy, B represents at least one type of atom selected from the group consisting of Ba, Sr and Ca, and C represents at least one type of atom selected from the group consisting of Co, Fe, Ni, Ce, Zr and Cr, and x, y, z, u, v and δ are the numbers that satisfy the following formulas:

$0.02 \leq x \leq 0.4$, $0.25 \leq y \leq 0.5$, $0.90 \leq z \leq 1.05$, $0 \leq u \leq 0.5$, $v=1.0$, and at a temperature of 1000° C. in the open air, $2.97 \leq \delta \leq 3.04$.

6. A fuel cell according to claim 5, wherein in said formula x, y, z, u, v and δ are the numbers that satisfy the following formulas:

$0.02 \leq x \leq 0.3$, $0.25 \leq y \leq 0.4$, $0.95 \leq z \leq 1.0$, $0 \leq u \leq 0.2$, $V=1.0$, and at a temperature of 1000° C. in the open air, $2.97 \leq \delta \leq 3.04$.

7. A solid oxide fuel cell according to claim 5, wherein said perovskite-type composite oxide contains Si and Al as impurities in amounts of smaller than 300 ppm, respectively, and other metal impurities in amounts of smaller than 500 ppm, respectively, the total amount of the metal impurities being smaller than 2000 ppm.

8. A solid oxide fuel cell according to claim 5, wherein said perovskite-type composite oxide has an average pore size of 1 to 5 μm, an open porosity of 15 to 45%, and an average grain size of 3 to 25 μm.

9. A solid oxide fuel cell in which an air electrode is provided on one surface of a solid electrolyte and a fuel electrode is provided on the other surface thereof, wherein said air electrode comprises a perovskite-type composite oxide of a composition represented by the following formula

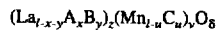

$(La_{1-x-y}A_xB_y)_z(Mn_{1-u}C_u)_vO_\delta$ wherein A represents at least one type of atom selected from the group consisting of Sc, Y, Nd, Yb, Er, Gd, Sm and Dy, B represents at least one type of atom selected from the group consisting of Be, Sr and Ca, and C represents at least one type of atom selected from the group consisting of Mg, Zn, Sb and Al, and x, y, z, u, v and δ are the numbers that satisfy the following formulas:

$0.02 \leq x \leq 0.4$, $0.25 \leq y \leq 0.5$, $0.90 \leq z \leq 1.05$, $0 \leq u \leq 0.3$, $v=1.0$, and at a temperature of 1000° C. in the open air, $2.97 \leq \delta \leq 3.04$.

10. A solid oxide fuel cell according to claim 9, wherein in said formula, x, y, z, u, v and δ are the numbers that satisfy the following formulas:

$0.02 \leq x \leq 0.3$, $0.25 \leq y \leq 0.4$, $0.95 \leq z \leq 1.0$, $0 \leq u \leq 0.2$, $v=1.0$, and at a temperature of 1000° C. in the open air, $2.97 \leq \delta \leq 3.04$.

11. A solid oxide fuel cell according to claim 9, wherein said perovskite-type composite oxide contains Si and Al as impurities in amounts of smaller than 300 ppm, respectively, and other metal impurities in amounts of smaller than 500 ppm, respectively, the total amount of the metal impurities being smaller than 2000 ppm.

12. A solid oxide fuel cell according to claim 9, wherein said perovskite-type composite oxide has an average pore size of 1 to 5 μm, an open porosity of 15 to 45%, and an average grain size of 3 to 25 μm.

\* \* \* \* \*